US010625858B2

United States Patent
Eleryan et al.

(10) Patent No.: US 10,625,858 B2
(45) Date of Patent: Apr. 21, 2020

(54) FLIGHT CONTROL FOR AN UNMANNED AERIAL VEHICLE

(71) Applicant: CLEO ROBOTICS INC., Calgary, Alberta (CA)

(72) Inventors: Omar Eleryan, Calgary (CA); Szymon Czarnota, Calgary (CA)

(73) Assignee: Cleo Robotics Inc., Calgary, Alberta, CA (US)

( * ) Notice: Subject to any disclaimer, the term of this patent is extended or adjusted under 35 U.S.C. 154(b) by 0 days.

(21) Appl. No.: 16/323,704

(22) PCT Filed: Aug. 8, 2017

(86) PCT No.: PCT/CA2017/050940
§ 371 (c)(1),
(2) Date: Feb. 6, 2019

(87) PCT Pub. No.: WO2018/027315
PCT Pub. Date: Feb. 15, 2018

(65) Prior Publication Data
US 2019/0185161 A1    Jun. 20, 2019

Related U.S. Application Data

(60) Provisional application No. 62/440,589, filed on Dec. 30, 2016, provisional application No. 62/396,539, (Continued)

(51) Int. Cl.
*B64C 39/02* (2006.01)
*B64C 27/08* (2006.01)
(Continued)

(52) U.S. Cl.
CPC ............ *B64C 39/024* (2013.01); *B64C 13/16* (2013.01); *B64C 27/08* (2013.01); *B64C 29/00* (2013.01);
(Continued)

(58) Field of Classification Search
CPC ... B64C 27/20; B64C 29/0025; B64C 39/062; B64C 39/064
See application file for complete search history.

(56) References Cited

U.S. PATENT DOCUMENTS 3,054,578 A    9/1962  Brocard
3,083,934 A *  4/1963  Vanderlip ............... B64C 27/20
                                          244/5
(Continued)

FOREIGN PATENT DOCUMENTS

DE   10 2013 004 881 A1    9/2014
WO   WO-2016166366 A1 * 10/2016 ............. A63H 27/12

OTHER PUBLICATIONS

International Search Report and Written Opinion issued in PCT/CA2017/050940 dated Nov. 7, 2017.

*Primary Examiner* — Joseph W Sanderson
(74) *Attorney, Agent, or Firm* — Foley & Lardner LLP

(57) ABSTRACT

A lightweight, pocket-sized unmanned aerial vehicle (UAV) that can be held in an outstretched hand by a user for take-off and landing of the UAV. The UAV comprises a semi-toroidal or a substantially toroidal hollow body that defines a duct. The UAV further comprises a motor for rotating a fan that directs air into and out of the duct enabling the UAV to take flight. The UAV comprises a flight-control system that comprises at least two flight control surfaces that can alter the directed air as it flows through the duct for controlling the roll and pitch and optionally the yaw of the UAV during flight. The flight control system may be controlled by a microprocessor controller. The UAV further comprises a payload, with at least a wireless transmitter and receiver unit.

20 Claims, 24 Drawing Sheets

Related U.S. Application Data filed on Sep. 19, 2016, provisional application No. 62/371,930, filed on Aug. 8, 2016.

(51) Int. Cl.
  *B64D 47/08* (2006.01)
  *B64C 29/00* (2006.01)
  *B64C 39/00* (2006.01)
  *B64C 13/16* (2006.01)

(52) U.S. Cl.
  CPC .............. *B64C 39/00* (2013.01); *B64C 39/02* (2013.01); *B64C 39/028* (2013.01); *B64D 47/08* (2013.01); *B64C 2201/027* (2013.01); *B64C 2201/042* (2013.01); *B64C 2201/08* (2013.01); *B64C 2201/108* (2013.01); *B64C 2201/127* (2013.01); *B64C 2201/141* (2013.01); *B64C 2201/146* (2013.01); *B64C 2201/162* (2013.01); *B64C 2201/18* (2013.01); *B64C 2201/20* (2013.01)

(56) References Cited

U.S. PATENT DOCUMENTS

| | | | | |
|---|---|---|---|---|
| 4,461,436 A | * | 7/1984 | Messina | B64C 27/20 244/23 C |
| 4,795,111 A | * | 1/1989 | Moller | B64C 27/00 244/100 R |
| 5,035,377 A | * | 7/1991 | Buchelt | B64C 11/001 244/12.1 |
| 5,152,478 A | * | 10/1992 | Cycon | B64C 27/10 244/12.2 |
| 6,450,445 B1 | * | 9/2002 | Moller | B64C 29/02 244/12.1 |
| 6,834,829 B2 | * | 12/2004 | Dunagin, Jr. | B64C 27/20 244/12.2 |
| 6,976,653 B2 | * | 12/2005 | Perlo | B64C 27/20 244/12.2 |
| 7,364,115 B2 | * | 4/2008 | Parks | B64C 11/001 244/12.4 |
| 8,240,597 B2 | * | 8/2012 | Entsminger | B64C 27/20 244/23 C |
| 8,511,606 B1 | | 8/2013 | Lutke et al. | |
| 8,833,692 B2 | * | 9/2014 | Yoeli | B64C 29/0025 244/23 A |
| 9,815,552 B1 | * | 11/2017 | Welsh | B64C 27/20 |
| 10,343,771 B1 | * | 7/2019 | Kaiser | B64C 25/06 |
| 2004/0129831 A1 | * | 7/2004 | Dunagin, Jr. | B64C 27/20 244/26 |
| 2004/0129833 A1 | * | 7/2004 | Perlo | B64C 27/20 244/70 |
| 2006/0097107 A1 | * | 5/2006 | Parks | B64C 11/001 244/52 |
| 2008/0191101 A1 | * | 8/2008 | Hatton | B64C 5/12 244/213 |
| 2012/0126064 A1 | | 5/2012 | Entsminger et al. | |

\* cited by examiner

FLIGHT CONTROL FOR AN UNMANNED AERIAL VEHICLE

CROSS-REFERENCES TO RELATED APPLICATIONS

This application is a U.S. National Stage Application under 35 U.S.C. § 371 of International Patent Application No. PCT/CA2017/050940, filed on Aug. 8, 2017, which claims the benefit of priority to United States Provisional Patent Application Nos. 62/440,589, filed on Dec. 30, 2016; 62/396,539, filed on Sep. 19, 2016; and 62/371,930, filed on Aug. 8, 2016, the disclosure of each of which is incorporated by reference herein in its entirety.

TECHNICAL FIELD

The present disclosure relates to the field of aerial vehicles. In particular, the present apparatus relates to an unmanned aerial vehicle for carrying a payload and that is dimensioned to be stored in a user's pocket and that can be released from and land upon a surface, for example the user's outstretched hand or a mounting unit.

BACKGROUND

Unmanned aerial vehicles (UAVs) perform various tasks including aerial surveillance for military, civilian and commercial purposes.

U.S. Pat. No. 4,795,111 to Moller describes a vertical take-off and landing (VTOL) type of UAV that uses a single propeller to direct air through a single duct for generating lift. The single duct has multiple vanes and spoilers that act together to control the flight path of the UAV. At least the spoilers described in Moller are positioned within the single duct, which may reduce the air flow therethrough and the lift capabilities of this UAV. Furthermore, Moller describes an engine that requires a fuel tank, which is carried upon the UAV.

U.S. Pat. No. 5,152,478 to Cycon et al. describes another VTOL UAV with a single duct that is defined by a toroidal-shaped fuselage. This UAV has dual, counter-rotating blades that direct air through the single duct for generating lift. The flight path of the UAV is controlled by collective and cyclic pitch control of the counter-rotating blades. Cycon describes housing diametrically opposed fuel tanks within the toroidal-shaped fuselage.

U.S. Pat. No. 6,450,445 also to Moller describes another VTOL UAV that uses dual, counter-rotating blades that direct air through a single duct for generating lift. The flight path of the UAV is controlled by trough-shaped air deflection assemblies that are positioned at an output end of the duct for collecting and redirecting a portion of the directed air.

These known UAVs all require components such as fuel tanks or exposed deflection assemblies that contribute to the overall mass and size of the UAV.

SUMMARY

Embodiments of the present disclosure relate to an unmanned aerial vehicle (UAV) that is small enough for a user to store the UAV in a pocket of their clothing, purse, or hand bag. The UAV is also lightweight and safe to allow the user to hold the UAV in an outstretched hand for take-off and landing. Further embodiments of the present disclosure relate to a multipurpose video capture assembly including a UAV.

Embodiments of the present disclosure relate to a UAV that comprises a body that defines a duct for generating thrust of airflow therethrough. The UAV further comprises at least one fan for directing a flow of air into a first end of the duct and out a second end that is opposite the first end. The directed air flow creates a reactionary thrust-force for substantially vertical take-off and landing of the UAV. The UAV also comprises a flight-control system that comprises at least two flight control surfaces that can independently, or together, change the direction, pressure and rate of the directed air as it flows through the duct. The flight-control system further comprises actuators that are operatively connected to each flight control surface for controlling the position of each flight control surface within the central duct. The position of each flight control surface may be used to control one or more of the yaw, roll and pitch of the UAV during flight. The actuators may be controlled by one or more pre-programmed algorithms, artificial intelligence, a remote user or combinations thereof. The body of the UAV may also be hollow and comprise a payload that may include one or more of various electronic components, such as a wireless transmitter and receiver unit, a camera, location-determining equipment and sensors.

Flight of the UAV can be, at least partially, controlled by a user's handheld electronic device. For example, the user's hand-held electronic device may have an interactive software application that can be used to operate and control the UAV. By interaction with the software application and one or more different communication capabilities of the hand-held device, the user can send commands to the UAV and receive information from the UAV. For example, the user can receive telemetry pertaining to the UAV's location, or an image or stream of images in the form of a video-feed that are captured by the UAV's camera, which is viewable in real time on the user's handheld device. The user can then command the camera to capture at least one digital image, such as a picture or video, which may be stored on-board the UAV and/or on an external and remote server and/or on the handheld device, or combinations thereof. Optionally, the user can also command the UAV to change its aerial position relative to the UAV's current location, the handheld device or some other external landmark to change the image that the UAV's camera may capture. When the user has captured all of the desired images, the user can then command the UAV to return to and land upon the user's hand. The user may then store the UAV in a pocket of their clothing or a purse or a handbag until the next flight and image or images are captured.

Some embodiments of the present disclosure relate to a mounting device for releasably engaging the UAV for secure storage and/or transport of the UAV when it is not being flown. The mounting device may include a supplemental power source for transferring electrical power to the UAV. Optionally, the camera or other devices may also be activated to capture imagery or collect data while the UAV is engaged with the mounting device. The captured data may be stored onboard the UAV, or in the mounting device, or in an external and remote server, or in any other external device such as a smartphone, tablet or computer.

Some embodiments of the present disclosure relate to a UAV that can be used for one or more security applications. For example, a sensor that is provided onboard the UAV or located at a location that is remote from the UAV may be activated and subsequently activate the UAV. The sensor may be any type of sensor that can detect a change indicative of the presence of an intruder in an environment in the vicinity of the sensor. Any such presence of an intruder in the monitored environment may activate the sensor. Examples of such sensors include, but are not limited to, passive detectors, infrared detectors, vibration detectors, ultrasonic detectors, a continuous wave motion detector or combinations thereof When the sensor is triggered, the UAV will receive an activation signal that activates the flight-control system and causes the UAV to fly autonomously to the location of the triggered sensor or any other predetermined location. At the predetermined location, the UAV may scan for, identify, track and follow a source that triggered the sensor. The source may be an individual that triggered the sensor. The UAV may also reposition itself proximate to the predetermined location in order to capture images of the local environment of the sensor. The UAV may store the digital file on the UAV's onboard memory, a remote server, a mounting device, or combinations thereof. The UAV may also send a notification and/or a copy of the digital images or live footage to a preselected email address, a smartphone, a computer network or to a control center. The UAV may then return to and re-mount upon the mounting device.

In another embodiment of the present disclosure, a user can operate the UAV remotely to capture images of a desired location that may be outside or inside a building. For example, this embodiment may be useful for surveillance of public spaces such as airports, shopping centers, sporting events and the like. Optionally, the UAV may incorporate algorithms that analyze the captured images onboard the UAV, or on an external remote server and detect any security breaches or any other desired tasks, such as facial recognition tasks. The analysis software may send notifications to security personnel when a security breach or any other triggering event is detected.

In another embodiment of the present disclosure, a first-response personnel or a soldier can operate the UAV remotely to capture data from a building in the case of an emergency such as fire or hostage situation. The UAV can also operate autonomously with the help of artificial intelligence and machine learning to create a 3D map of the interior of a building, and inspect each room with the help of cameras and sensors (infrared for example), to ensure that no living creatures are trapped in the building. If life is detected, information will be relayed to an electronic device, which could include a 3D map of the quickest route that first-response can follow to tend to the victims.

In another embodiment of the present disclosure, a user can operate the UAV remotely to inspect a tight space such as an air duct or a pipeline. The UAV can also operate autonomously with the help of artificial intelligence and machine learning to perform routine maintenance checks and inspections. The UAV may have onboard an array of sensors and equipment which could include a camera to perform inspections and maintenance work. Optionally, the UAV may incorporate algorithms that analyze the captured data onboard the UAV and detect any leaks or hazards and notify the user of their exact location and nature.

In accordance with a broad aspect of the present invention, therefore there is provided an unmanned aerial vehicle comprising: a substantially toroidal body that defines a duct with an upper end and a lower end that is opposite to the upper end; an electronic controller housed within the body; at least one electric motor that is controlled by the controller; at least one fan within the duct that is operatively coupled to the at least one electric motor for rotating the at least one fan and creating an airflow into the upper end of the duct and out the lower end of the duct for creating thrust; and a flight-control system configured to receive instructions from the controller; the flight-control system including at least two flaps installed on the body and configured to redirect the airflow at the lower end of the duct, the at least two flaps each being moveable between a retracted position, wherein each flap is retracted into the body, and a protruding position, wherein each flap protrudes out from the body and into an area of the duct adjacent the lower end and based upon the received instructions, the flight control system is configured to move each of the at least two flaps between the retracted position and the protruding position for controlling the roll, pitch or both of the unmanned aerial vehicle during flight.

In accordance with another broad aspect, there is further provided a multipurpose video capture assembly comprising: an unmanned aerial vehicle (UAV) including: a substantially toroidal body that defines a duct with an upper end and a lower end that is opposite to the upper end, the body having a height of between about 15 and 60 mm and an outer diameter of between about 50 and 150 mm; an electronic controller housed within the body; at least one electric motor that is controlled by the controller; at least one fan within the duct that is operatively coupled to the at least one electric motor for rotating the at least one fan and creating an airflow into the upper end of the duct and out the lower end of the duct for creating thrust; and a flight-control system configured to receive instructions from the controller, the flight-control system including flight control surfaces on the body configured to redirect the airflow at the lower end of the duct for controlling the roll and/or pitch of the UAV during flight; and a mounting device including: a UAV supporting surface configured to support the UAV on the mounting device; and a mounting surface connected to the UAV supporting surface and configured to support the mounting device on an object.

BRIEF DESCRIPTION OF THE DRAWINGS

These and other features of the present disclosure will become more apparent in the following detailed description in which reference is made to the appended drawings:

FIGS. 5 are views of a UAV similar to the UAV of FIG. 1, but shown in greater detail: FIGS. 5A, 5B, and 5C are collectively referred to herein as FIGS. 5;

FIGS. 6 are cross-section side-elevation views of a portion of a UAV according to another embodiment of the present disclosure: FIGS. 6A, 6B, and 6C are collectively referred to herein as FIGS. 6;

FIGS. 7 are cross-section side-elevation views of a portion of a UAV according to another embodiment of the present disclosure.

FIGS. 7A, 7B, and 7C are collectively referred to herein as FIGS. 7;

FIGS. 8 show examples of results from a computer simulation of the UAV 100, at different flap insertions into the airflow, as confirmed by experiments, and a computational fluid dynamics analysis of the UAV of FIG. 1: FIGS. 8A, 8B, and 8C are collectively referred to herein as FIGS. 8;

FIG. 21A is an exploded, isometric view of a UAV and a mounting station; and FIG. 21B is an isometric view of the UAV docked on the docking station.

DETAILED DESCRIPTION

As used herein, the term "about" refers to an approximately +/−10% variation from a given value. It is to be understood that such a variation is always included in any given value provided herein, whether or not it is specifically referred to.

FIG. 1 through FIG. 5C illustrate one embodiment of the present disclosure that relates to a first unmanned aerial vehicle (UAV) 100. The first UAV 100 comprises a fuselage that may be of a unitary construction or alternatively, a multiple-component construction. In some embodiments of the present disclosure, the shape of the fuselage may be substantially toroidal or semi-toroidal or toroidal, which means ring-shaped. The fuselage may be toroidal about a center axis, sometimes referred to as vertical axis x. In some embodiments of the present disclosure, the fuselage comprises at least two parts i.e., a first part 103 and a second part 104. When engaged together, the first and second parts 103, 104 define a substantially hollow chamber within the fuselage that extends circumferentially and that is configured to house a payload of further components of the first UAV 100. The first and second parts 103, 104 also define a continuous outer edge extending from the upper surface to the lateral surface to the lower surface of the fuselage and then, being ring shaped, the parts forming the body extend into an inner duct 101 concentric about the axis x. The duct 101 interconnects the upper and lower surfaces of the fuselage.

Figure 3:
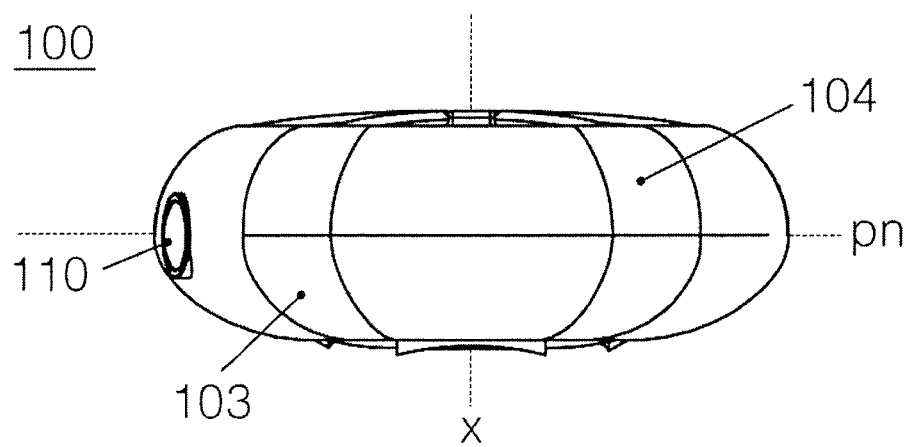
FIG. 3 is a side-elevation view of the UAV of FIG. 1 (an inflight configuration)

The fuselage may be free of outer attachments such that even during flight the UAV retains a clean toroidal shape on its outer circumferential surface such as is shown in FIG. 3.

The distance between the outer upper-edge and the outer lower-edge defines a height of the first UAV 100. In some embodiments of the present disclosure, the height of the first UAV 100 may be between about 15 mm and about 60 mm. For clarity, 1 mm is equivalent to 0.1 cm, and 1 cm is equivalent to about 0.39 inches. In other embodiments of the present disclosure, the height of the first UAV 100 may be between about 30 and 40 mm.

A distance between two opposed and co-planar points on the outer lateral edge that are furthest apart defines a width of the fuselage. The width of the first UAV 100 may also be generally referred to herein as the outer diameter (OD) of the first UAV 100. The opposed points that define the width of the fuselage may also define a horizontal plane pn of the first UAV 100, which extends orthogonal to the vertical axis x at approximately the midpoint between the upper surface and the lower surface. In some embodiments of the present disclosure, the width of the first UAV 100 may be between about 50 mm and about 150 mm. In other embodiments of the present disclosure, the width of the first UAV may be 80 to 100mm or about 90 to 95 mm.

Figure 2:
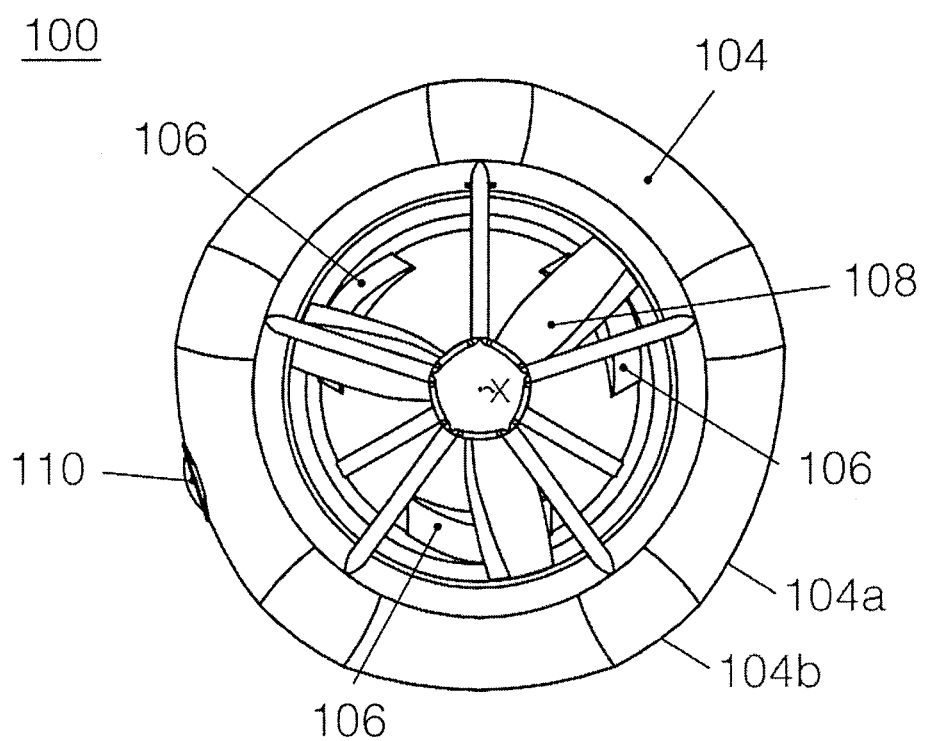
FIG. 2 is a top plan view of the UAV of FIG. 1.

The width of the UAV can be consistent about the full body circumference, thereby forming a perfectly circular outer edge shape in plan view. Alternatively, as shown, the body can have a varying radial length, such as one formed by varying the outer surface curvature along the circumference in plan view. For example, as shown in FIG. 2, the curvature along the outer edge of segment 104a is different that the curvature along the outer edge of segment 104b. This varying radial length, and thereby varying outer curvature, could strengthen the fuselage, and even permit thinner body wall thickness over a perfectly circular outer circumferential curvature (i.e. consistent radial length).

As a person skilled in the art will appreciate, the height and width of the first UAV 100 may vary within and beyond the specific ranges provided. This variation may depend upon the desired use and a payload that the first UAV 100 may carry. Preferably, the height and width of the first UAV 100 allow a user to carry the first UAV 100 in a pocket of their clothing or accessory, such as a purse or a handbag until the next flight and a further image or images are captured. In other words, the first UAV 100 is pocket-sized and can conveniently fit in a pocket. As an example, the first UAV 100 can conveniently fit inside a back pocket or a front pocket of a pair of pants wherein the pocket has a center height that falls at least within a range of about 12.7 cm to about 16.5 cm, a side height that falls at least within a range of about 10.8 cm to about 14 cm, a top width of 12 cm to about 15.9 cm and a bottom width of about 10.2 cm to about 12.7 cm. Because many articles of clothing and accessories are made with textiles that have at least some pliability that, among other factors, may contribute to a broader range of pocket sizes that the first UAV 100 will fit into. The first UAV 100 can carry a payload. The payload may include any combination of components such as equipment, instruments, sensors, and the like.

In some embodiments of the present disclosure, the payload may include one or more of a power source 111, a camera 110 such as a digital or infrared camera, an accelerometer, a gyroscope, a magnetometer, a computing module, a barometer, global positioning system (GPS) equipment, a proximity sensor, sonar equipment, avionics equipment, optical flow sensors, other location-determining equipment, and the like, and any combinations thereof.

Some or all of the components that comprise the payload may be inside or carried on the hollow fuselage. Preferably the payload is located inside the hollow fuselage so that there are minimal or no structural features that extend from the outer surface of the fuselage.

Embodiments of the present disclosure relate to a UAV that is of minimal size and, therefore, minimal mass. For example, the first UAV 100 may have a total mass within a range of about 30 g to about 125 g. In some embodiments of the present disclosure, the first UAV 100 may have a total mass of about 85 g. As will be appreciated by the person skilled in the art, the total mass of the first UAV 100 may vary depending upon the specific dimensions and the components that comprise the payload. Accordingly, the fuselage is constructed from lightweight but strong materials including but not limited to high strength and light weight polymers that may or may not be reinforced for increased strength. For example the polymers may be reinforced with carbon fibers, fiber glass, or other such materials. Furthermore, the payload may include components that perform a desired function e.g. capture images but that avoid unnecessarily contributing towards the overall mass of the UAV. Components of the payload that are electronic may be within the micron-scale or nano-scale.

Figure 1:
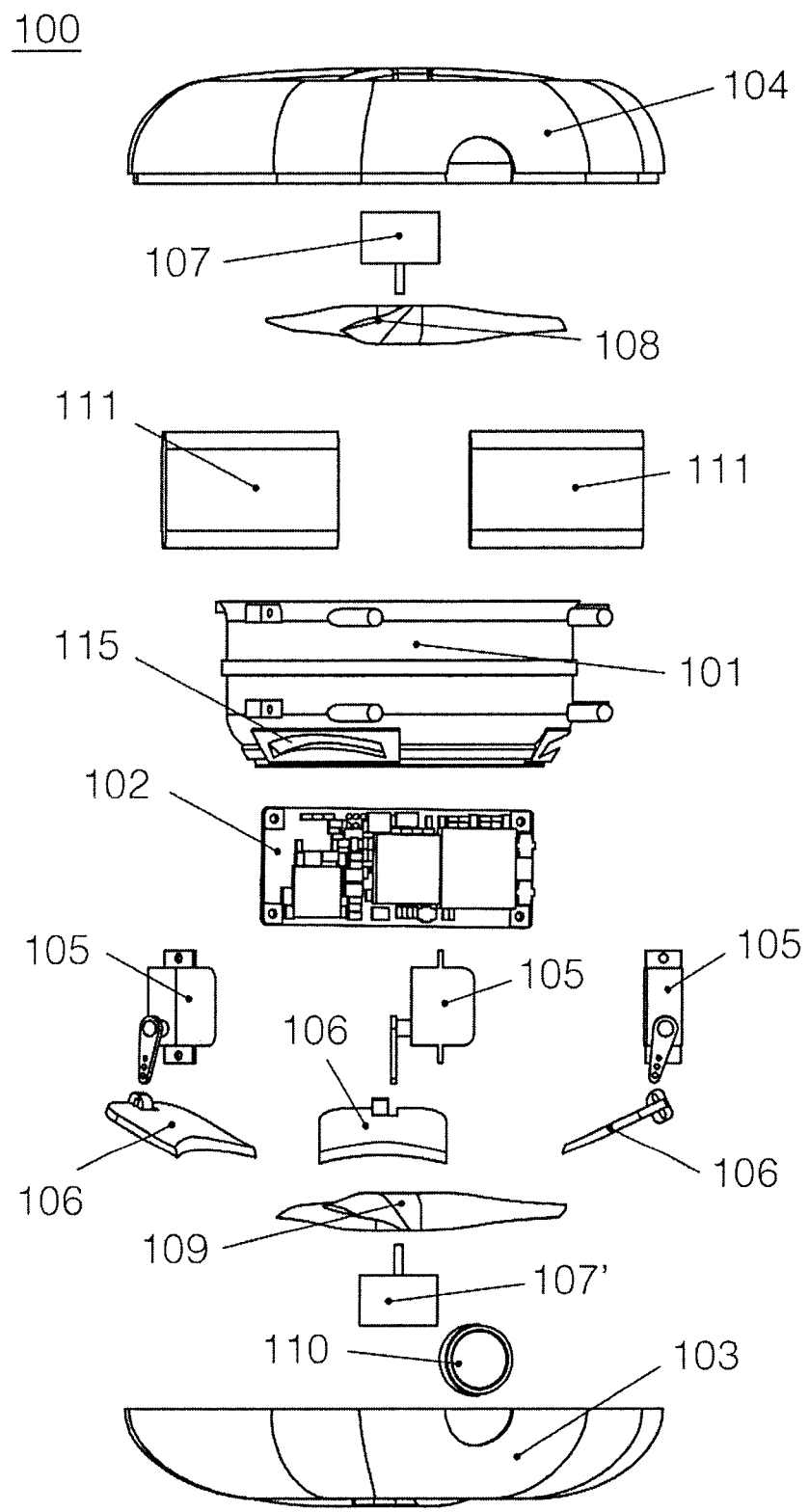
FIG. 1 is an exploded, side-elevation view schematic diagram of an unmanned aerial vehicle (UAV) according to one embodiment of the present disclosure.

The cross sectional shape of the fuselage may be selected for particular performance traits and esthetics. For example, with reference to FIG. 5, the shape of the fuselage in section may be circular or may be non-circular, such as ovoid, or shaped as an airfoil wing-shaped. The duct 101 may further define the cross sectional shape of the fuselage. Together, the first and second parts 103, 104 also define the duct 101 or alternatively as shown in FIG. 1, the duct 101 may be defined by a separate component that is positioned between or within the first and second parts 103, 104. The duct 101 has an upper end, a lower end and an inner facing wall surface that extends between the two ends. The inner diameter (ID) of the duct is defined by the distance between two opposed points on the inner facing wall surface of the duct 101. The ID of the duct 101 may also be referred to herein as the internal diameter (ID) of the first UAV 100. In some embodiments of the present disclosure, the duct 101 has a substantially circular cross-sectional shape (from a top plan view) with a substantially constant ID. For example, the ID of the duct 101 may be between about 30 mm and about 90 mm. In some embodiments of the present disclosure, the ID of the duct 101 may be about 60 mm. Alternatively, the ID of the duct 101 may be larger or smaller at each end relative to each other or relative to other portions of the duct 101. For example, the duct 101 may have a cross-sectional shape (from a side elevation view) that is wider or narrower at both or at one of the ends relative to other portions of the duct 101.

In some embodiments of the present disclosure, as shown in FIG. 5, the central duct 101 may include a portion 101*a* of its inner facing surface that has a larger ID. The larger diameter portion 101*a* may be positioned adjacent the body's lower surface as compared to other portions of the central duct 101. Without being bound by any particular theory, the diffuser central duct 101 with a flaring lower end portion 101*a* may increase the thrust performance of the duct and the overall aerodynamic properties of the UAV. The central duct may also include a larger diameter portion positioned at the top end, to allow more air to flow into the duct.

The duct 101 extends along axis x of the first UAV 100 orthogonal to the horizontal plane. In some embodiments of the present disclosure, the first UAV 100 has a center of gravity along the vertical axis. The center of gravity may also be referred to herein as the center of mass. In some embodiments of the present disclosure, the UAV 100's center of gravity may be along the vertical axis at generally the mid-point between the outer upper edge and the outer lower edges of the duct 101. Alternately, the center of gravity may be closer to the upper portion of the UAV. In some embodiments of the present disclosure, the power source 111 may be one of the heaviest components upon the first UAV 100. Different positions of the power source 111 may result in the desired location of the center of gravity. Optionally, one or more power sources can be used. In some embodiments of the present disclosure, two power sources may be used to distribute the mass and ensure that the center of gravity is along the vertical axis. Optionally, components other than, or in addition to, the power source 111 may be similarly positioned within the UAV to achieve the desired location of the center of gravity.

Rotation of the first UAV 100 about the vertical axis may be referred to as yaw. Movement of the UAV 100 up the vertical axis may be referred to as ascent. Movement of the UAV 100 down the vertical axis may be referred to as descent. Many movements of the first UAV 100 may best be defined by a direction that is at least partially along the vertical axis, hence the first UAV 100 may be considered a vertical take-off and landing (VTOL) UAV. The UAV takes off with the plane pn substantially in a horizontal position and the vertical axis x substantially vertical. When in flight, the UAV remains generally with the plane pn closer to horizontal than vertical.

The first UAV 100 may further comprise at least one motor 107 that is operatively coupled to at least one fan 108 for rotating the at least one fan 108. The at least one motor 107 and the at least one fan 108 are positioned within the duct 101. In some embodiments of the present disclosure, the at least one motor 107 may be an electric motor such as a brushless DC electric motor, alternatively, a brushed DC electric motor or any other type of electric motor that will provide the required torque while not adding excessive mass to the UAV 100. The at least one fan 108 may comprise one or more blades. Under control of a flight-control system, which is described in more detail below, the at least one motor 107 drives the at least one fan 108 to rotate about the vertical axis within the duct 101 to draw air into the upper end of the duct 101 and to push air out of the duct 101 through the lower end. Drawing air into the duct 101 and pushing air out the lower end of the duct 101 may also be referred to herein as airflow within the duct 101. The airflow within the duct 101 creates a lifting force that causes the first UAV 100 to move along the vertical axis. The lifting force may also be referred to herein as thrust. Modulating an output of the at least one motor 107 modulates the rotational speed of the at least one fan 108, which in turn modulates the lifting force that acts upon the first UAV 100. In some embodiments of the present disclosure, the at least one fan 108 may be one fan, two fans, or more than two fans. In further embodiments of the present disclosure, the at least one fan 108 may be a first fan 108 and a second fan 109. The first and second fans 108, 109 may rotate in opposite directions, which may also be referred to herein as counter-rotating. If there are two or more fans, the yaw of the first UAV 100 may be controlled by a differential rotational rate of the two or more fans.

The flight control system of the first UAV 100 comprises at least one printed circuit board (PCB) 102 which comprises one or more microprocessors, a wireless transmitter receiver (WTR) unit, one or more electronic speed controllers, one or more inertial measurement units (IMU), one or more sensors or any combination thereof. The flight control-system also comprises at least two actuators 105 and at least two flight control surfaces 106. Under instructions from the at least one microprocessor controller, the at least two actuators 105 causes the at least two flight control surfaces 106 to move within the duct 101 to alter the fluid dynamics of the airflow that is being pulled into and pushed out of the duct 101. Altering the fluid dynamics of the airflow within the duct 101 can be used to control the pitch and roll of the first UAV 100. The flight control system also controls the output of the at least one motor 107 to control the rotational speed of the at least one fan 108. In some embodiments of the present disclosure the first fan 108 and the second fan 109, are both operatively connected to the at least one motor 107. In other embodiments of the present disclosure, the at least one motor 107 may be accompanied by another motor 107', one of which is operatively connected to the first fan 108 and the other is operatively connected to the second fan 109.

Figure 4:
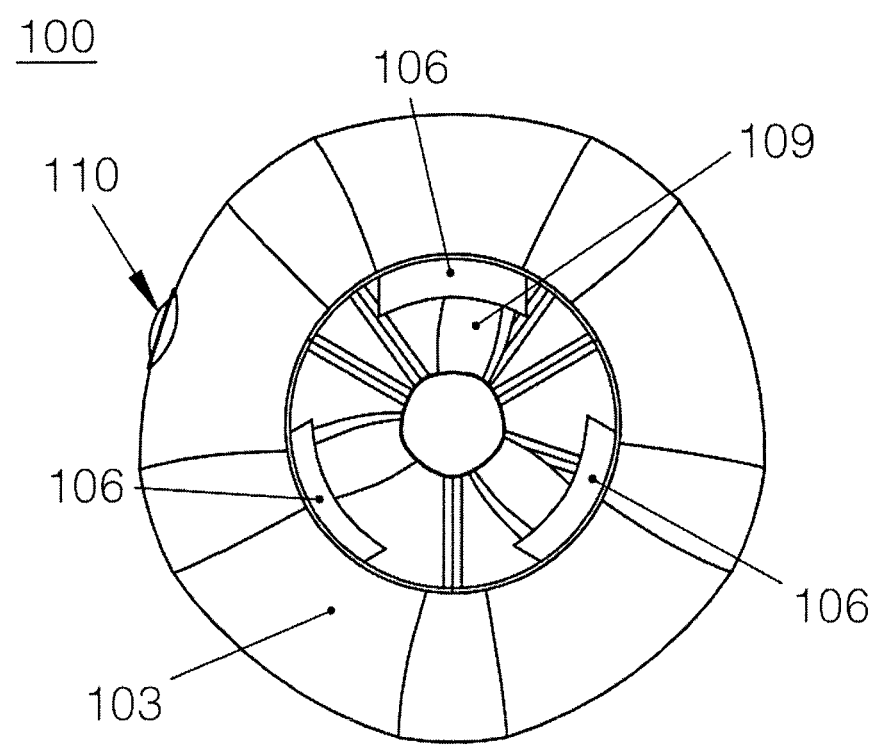
FIG. 4 is a bottom plan view of the UAV of FIG. 1.
Figure 5A:
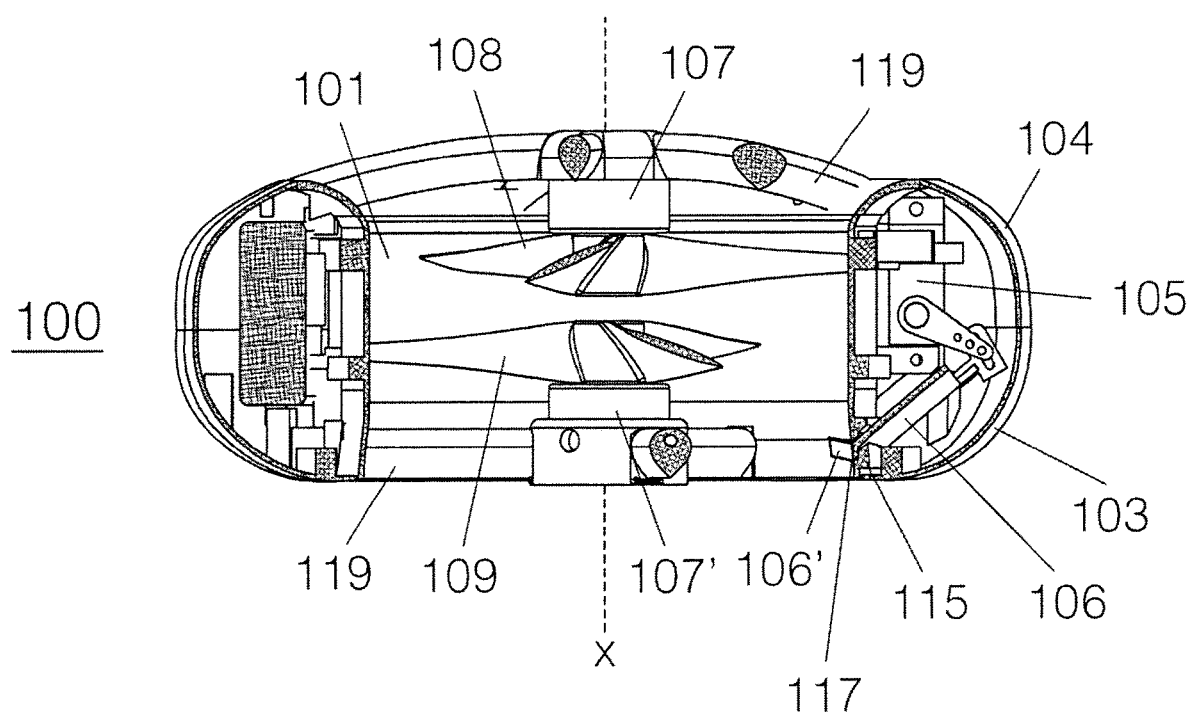
FIG. 5A is a vertical section through a full body of a UAV and sectioned along line I-I in FIG. 5C.
Figure 5B:
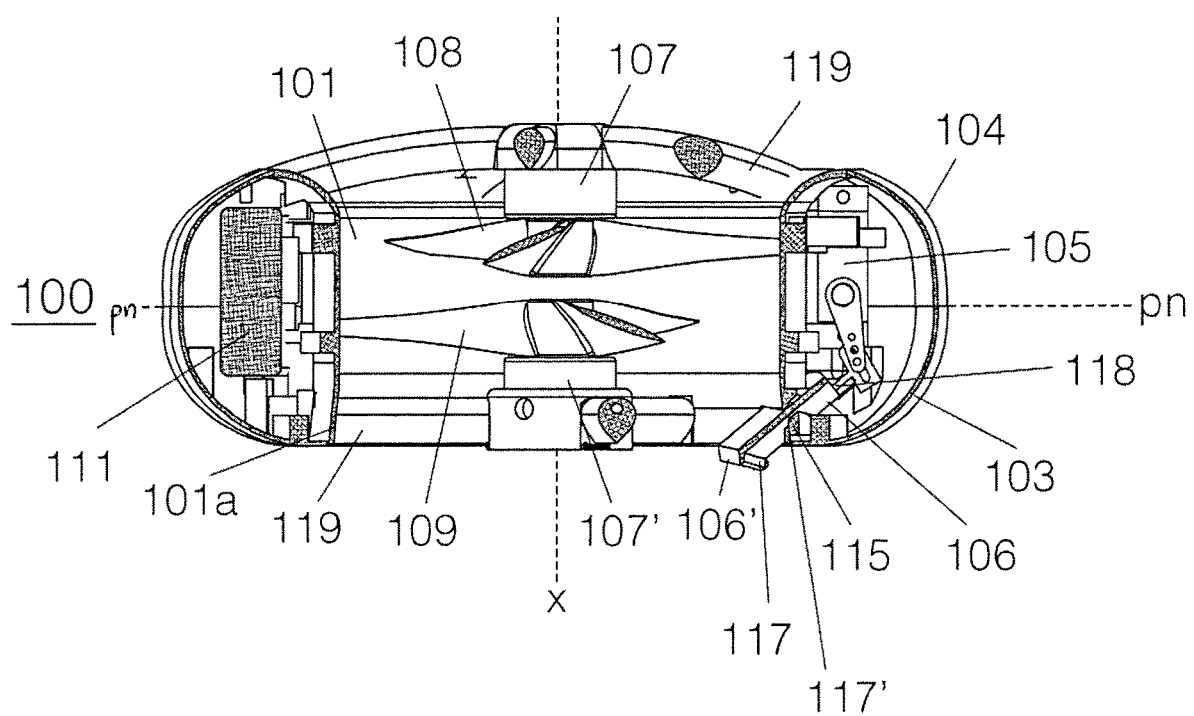
FIG. 5B is the UAV of FIG. 5A with the flap extended 100% into the duct.
Figure 5C:
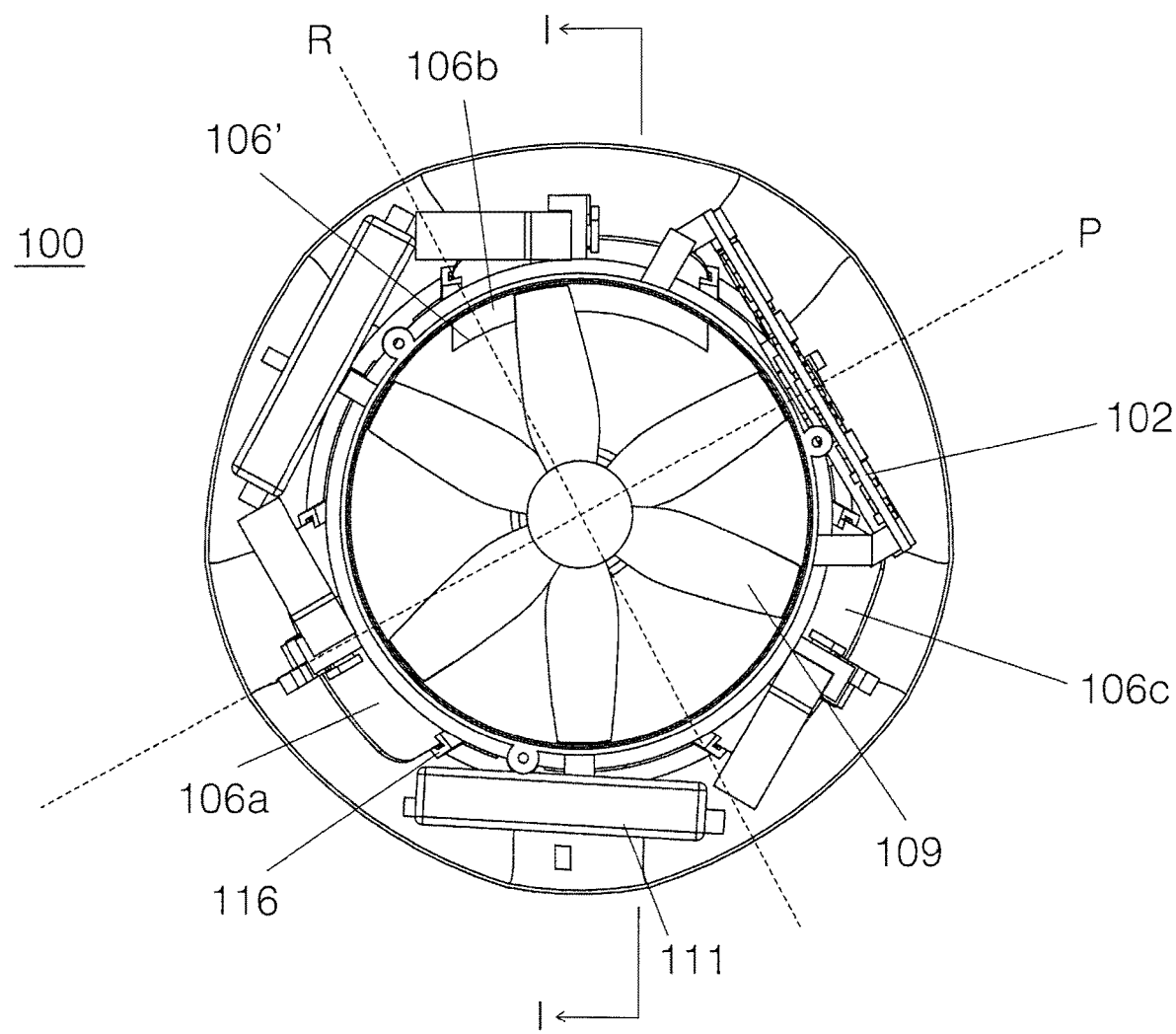
FIG. 5C is a top plan view of a UAV with the upper portion of the body removed to show internal components.

As shown in FIG. 1, some embodiments of the present disclosure relate to a flight control system that has at least one microprocessor, and three actuators 105 that are each operatively connected to one of three flight control surfaces 106. Each actuator 105 may be an electrically driven and controlled servomotor that is operatively connected with and moves an individual flight control surface 106. The servo-motor can be rotary or linear. The three flight control surfaces 106 may be evenly circumferentially spaced about the body and protrude relative to the duct into the air flow of the duct. The flight control surfaces protrude to affect air flow through the duct between the fan 109 and the lower surface, below the center of gravity and generally below the horizontal plane p. It has been found that the greater the distance between the center of gravity and the flight control surfaces 106, the greater the achievable control by operation of the surfaces 106. In FIGS. 4 and 5, the flight control surfaces protrude directly into the duct through slots 115 in the inner facing surface of the duct 101. In FIGS. 6 and 7, the flight control surfaces protrude from slots 115' and 115" in the lower surface of the body and into the air flow from the duct. In plan view, however, it can be appreciated that the flight control surfaces of all these embodiments protrude into the duct area to thereby affect air flow exhaust through the duct and the description therefore follows wherein "protruding into the duct" means either directly into the duct or below the duct but into the air flow from the fan through the duct and which is generally into the plan area of the duct.

In response to signals from the at least one microprocessor, one or more of the actuators 105 changes the position of its associated flight control surface 106 relative to the duct. Changing the position of one, two or all three flight control surfaces 106 alters the fluid dynamics within the duct 101 by changing the direction, pressure and rate of the air flowing through the duct 101. In the embodiment of present disclosure that is shown in FIGS. 1-5, each of the three flight control surfaces 106 is a flap that is retractable and protrudable into the duct. Each flap 106 has a position fully retracted (FIG. 5A) from protruding beyond the surface curvature of the body and each flap is further configured to have a protruding position (FIGS. 4 and 5B) to extend out from the body into the exhaust area of the duct 101 to alter airflow through the duct 101. The positions of each flap relative to the duct and relative to the other flaps of the UAV, control pitch, roll or both of the first UAV 100.

Flaps 106 are fully retractable into the body such that only exposed part of the flap is at a substantially flush orientation with the body, such as with the inner facing surface of duct 101 or part 103. As shown in FIG. 5A, the flap may be retracted but its outboard end 106' may remain adjacent to the inner facing surface of duct and in a position to fill the slot 115 (i.e. so there is substantially no pathway between the flap and the slot into the body). End 106' is exposed in duct 101 but is substantially flush with the curvature of the duct's inner facing surface. End 106' may therefore have a curve from side to side that conforms to the curvature of duct so that when fully retracted the flap neither protrudes into nor is receded back from the duct's inner facing surface. This ensures that there's very little to no interference from a flap with airflow when it is fully retracted.

Each flap 106 has a substantially fixed angle of incidence when acting in the fan exhaust. A fixed angle of incidence provides good durability and allows for full flap extension into the airflow with a relatively small force. All the flaps of the UAV may have the same angle of incidence. Generally, the angle will be down such that the outboard end 106' is further away from the fan 108 than the slot end. In one embodiment, the flaps are fixed at an angle of incidence of about 20-70° from axis x. In the embodiment of FIGS. 4 and 5, for example, flaps 106 are each guided by their slot configuration to remain in plane when protruding in the active positions and during protrusion and retraction. Each slot 115 for example, may be sloped to match the selected angle of incidence of the flap and to closely surround the flap. As shown in FIG. 5C, there may be a linear guide rail 116 for each flap to restrain the flap from pivoting when in, or moving into or out of, the protruding position. The linear guide rails may be on each side of the flap in the fuselage to maintain the flap travel on a substantially linear path so that the angle of incidence with the airflow within the duct 101 is substantially constant.

While each slot 115 may closely surround its flap 106 to ensure it is solidly held when in the protruding position, there may be surface treatments configured to reduce friction to ensure that the flap moves smoothly into and out of its retracted position. For example, the slot may include surface treatments configured to reduce friction, such as raised surfaces such as spaced apart buttons or a low friction coating on which the flap bears.

The flaps may be flat, concave or convex in their planar, upper surface shape. In the embodiment, of FIGS. 1-4, the flaps are flat from side to side. In the embodiment, of FIG. 5, flaps 106 are concave from side to side, or in other words, installed with a downwardly curved center region, which means the edges in guides 116 are closer to the fans than the middle of the flap. This concave curvature allows each flap to be placed further down in the duct away from fan 109, which effectively increases the flap's distance from the center of gravity to enhance control. In one embodiment, each flap has a consistent thickness over most of its area.

The flaps may include stops to control their movement, for example, to prevent a flap from retracting too far into the fuselage and from extending too far out from the fuselage. For example, each flap 106 may include an outboard end retraction stop 117, which may for example be a return or other enlargement on outboard end 106' larger than dimension of the slot. There may be a recess 117' adjacent the slot to accommodate the stop 117 so end 106' can be stored flush with the duct 101 inner facing wall. Each flap may also have an extension stop 118 that prevents overextension of the flap out into the duct.

The flaps may be driven from the retracted position to any of various protruding positions. Each actuator 105 may independently drive its flap from a retracted position through and into any of a number of protruded positions. These positions are referred to herein as % extensions. For example, 100% extension means that the possible extended length of the flap is fully extended. Extending the flap at different amounts of extension >0% up to 100% causes varying effect on flight.

Because the flaps 106 are moveable into the retracted position, the flaps may be retracted for storage and this ensures that they are protected against damage. When in the retracted position, the UAV is durable, esthetically clean and attractive and presents a very small overall volume, which facilitates storage.

The flaps may also be positioned in the retracted position during flight. For example, during takeoff, the flight control surfaces 106 may retract into the hollow fuselage through slots 115. In this retracted position, the surface of the duct 101 is substantially free of any flight control surfaces that might alter the characteristics of the airflow. When the flaps are fully retracted from the duct 101, the airflow through the duct 101 may be substantially evenly distributed along the outer perimeter of the lower edge of the duct. The substantially evenly distributed airflow through the duct 101 generates a reactive thrust force with a line of action that acts along the vertical axis generating a zero-net moment about the first UAV 100's center of mass which in some embodiments of the present disclosure is proximal to or above the plane p, and along axis x. This line of action may also be referred to herein as a thrust vector. In some scenarios, the user may prefer a less than true vertical-takeoff (i.e. launching at an angle other than about 90 degrees from the launching surface) or to compensate for wind, then one or more of the flight control surfaces 106 may extend at least partially into the duct during takeoff During flight, configuring a flap 106 to protrude into the duct exhaust generates a thrust vectoring effect. For example, flight of the first UAV 100 may be altered from only vertical lift by altering the airflow through the duct 101. Altered airflow through the duct 101 may be achieved by the microprocessor instructing one or more of the actuators 105 to move their respective flaps 106 into the duct airflow. In some embodiments of the present disclosure, the microprocessor instruction could be due to direct input from the user, or due to sensor reading from an Inertial Measurement Unit (IMU), an optical flow sensor, any other sensor, or a combination thereof.

The microprocessor can generate pitch and roll moments by moving the flaps into and out of the duct 101 for deflecting the thrust vector so that it does not pass through the first UAV's center of mass. For example, a flap can extend into the duct 101 and the airflow moves through the duct 101 and along the extended flap towards the lower edge. This disrupts the even distribution of airflow out of the duct 101, thus the thrust vector is shifted away from the center of mass of the vehicle, which generates a moment, about the center of mass. To ensure quick response, actuators 105 may generate drive forces to move the flaps from a fully extended to a fully retracted position in less than a second and possibly less than a tenth of a second.

Figure 8A:
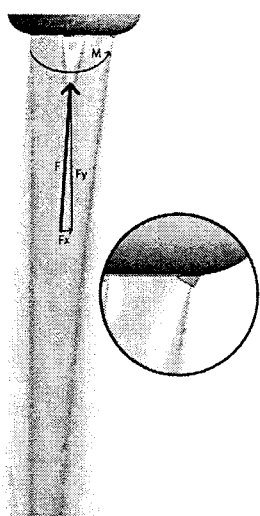
FIG. 8A represents thrust vectoring at 30% flap insertion.
Figure 8B:
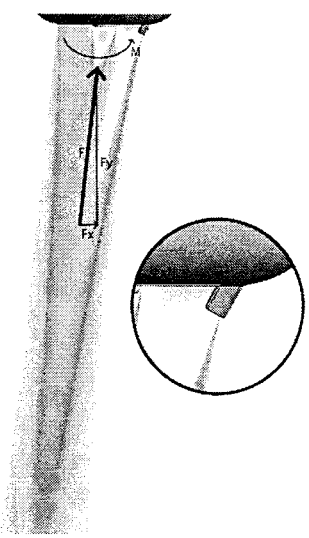
FIG. 8B represents thrust vectoring at 60% flap insertion.
Figure 8C:
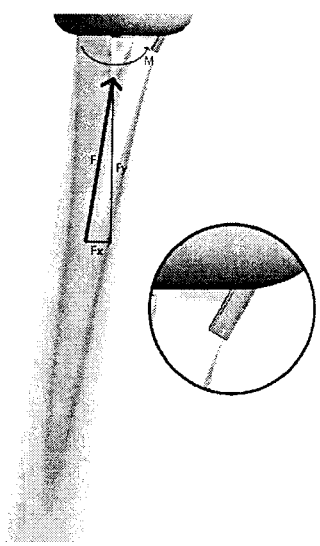
FIG. 8C represents thrust vectoring at 90% flap insertion.
Figure 9:
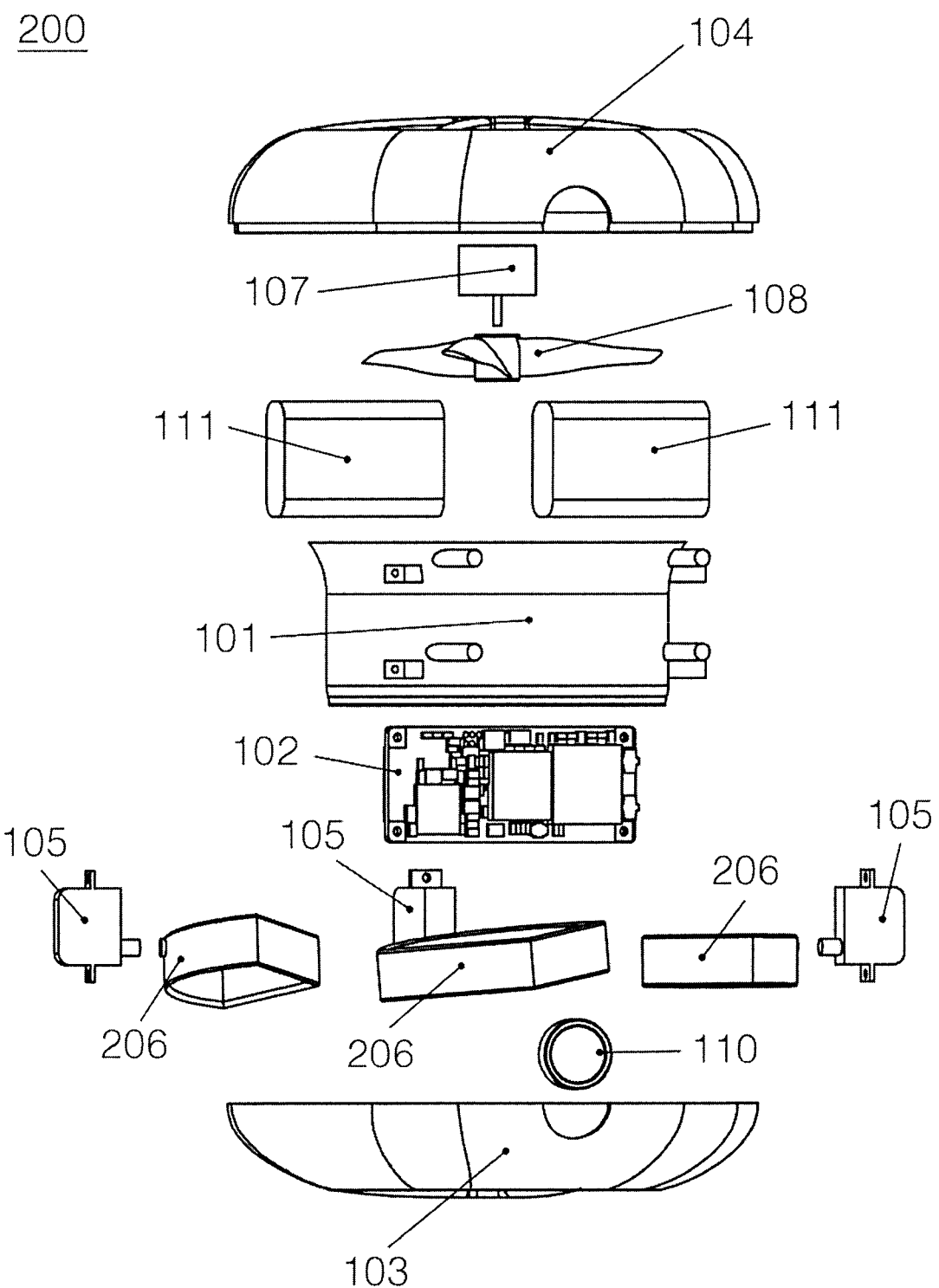
FIG. 9 is an exploded, side-elevation view schematic diagram of a UAV according to another embodiment of the present disclosure.
Figure 10:
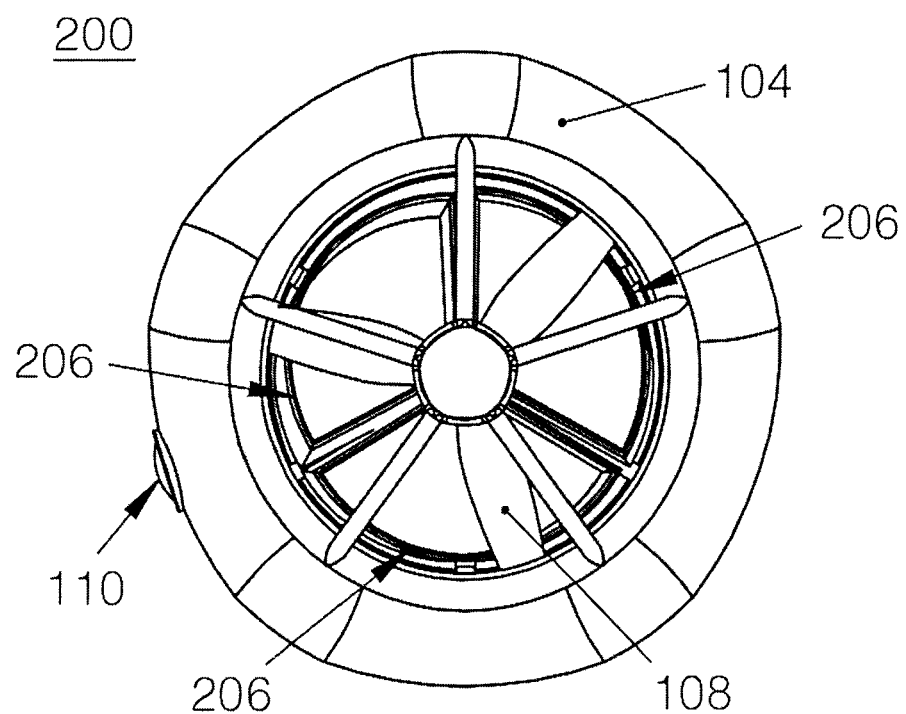
FIG. 10 is a top plan view of the UAV of FIG. 9.
Figure 11:
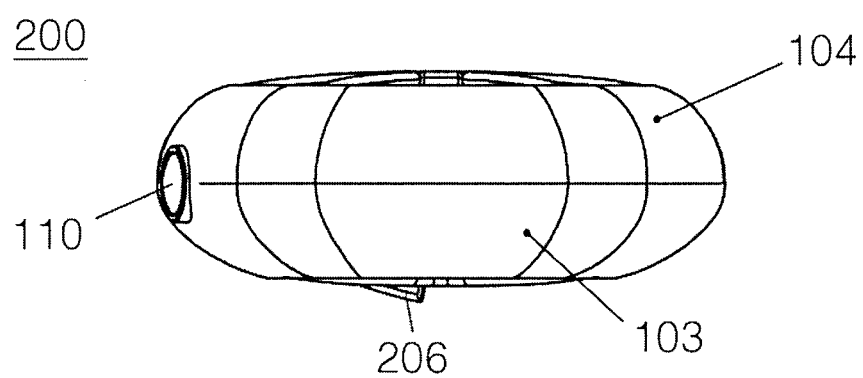
FIG. 11 is a side-elevation view of the UAV of FIG. 9.
Figure 12:
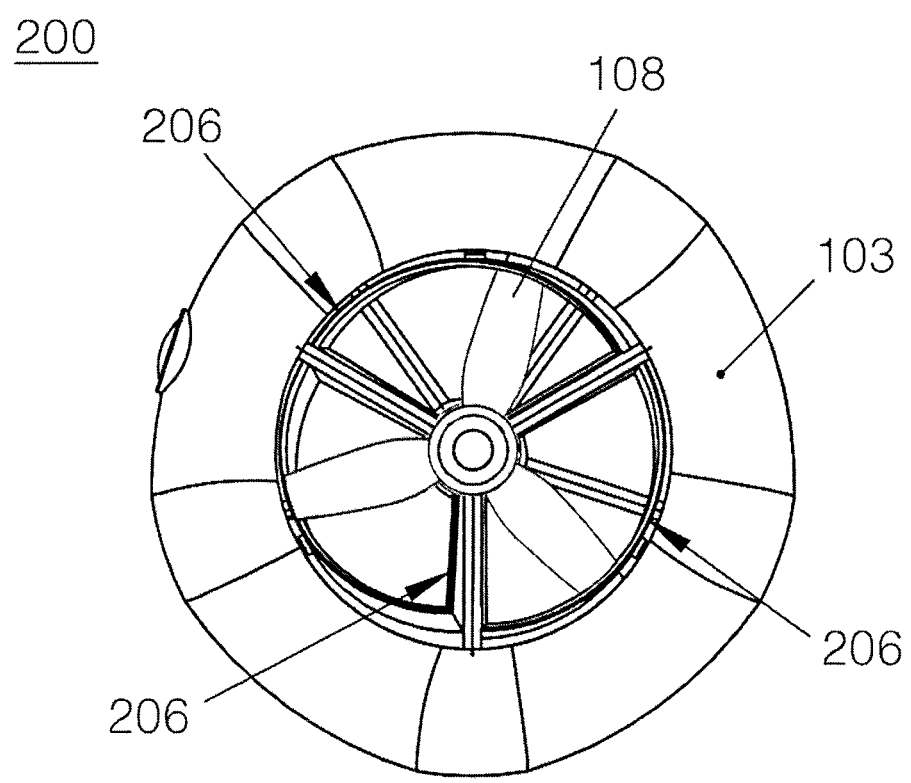
FIG. 12 is a bottom plan view of the UAV of FIG. 9.
Figure 13:
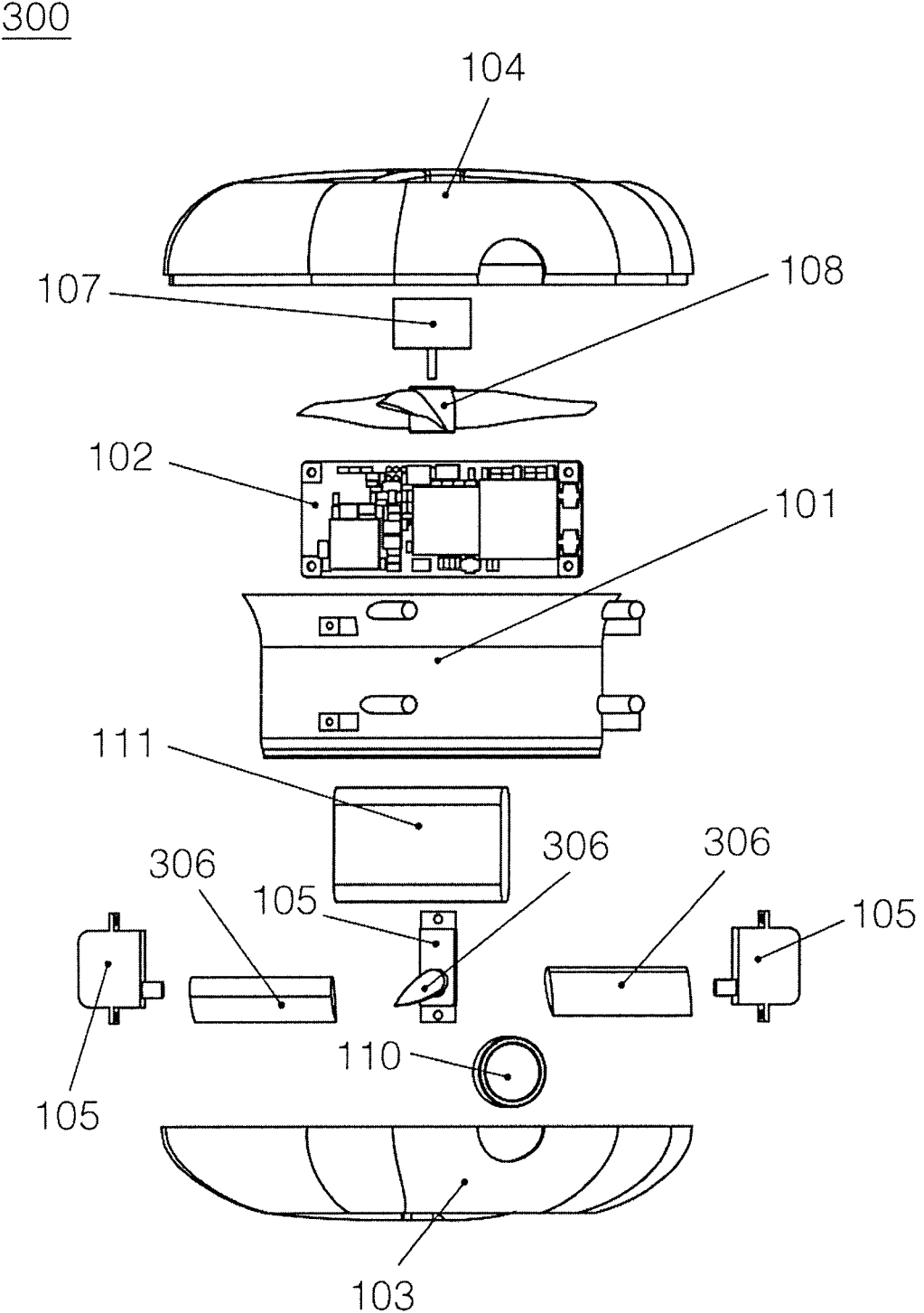
FIG. 13 is an exploded, side-elevation view schematic diagram of a UAV according to another embodiment of the present disclosure.
Figure 14:
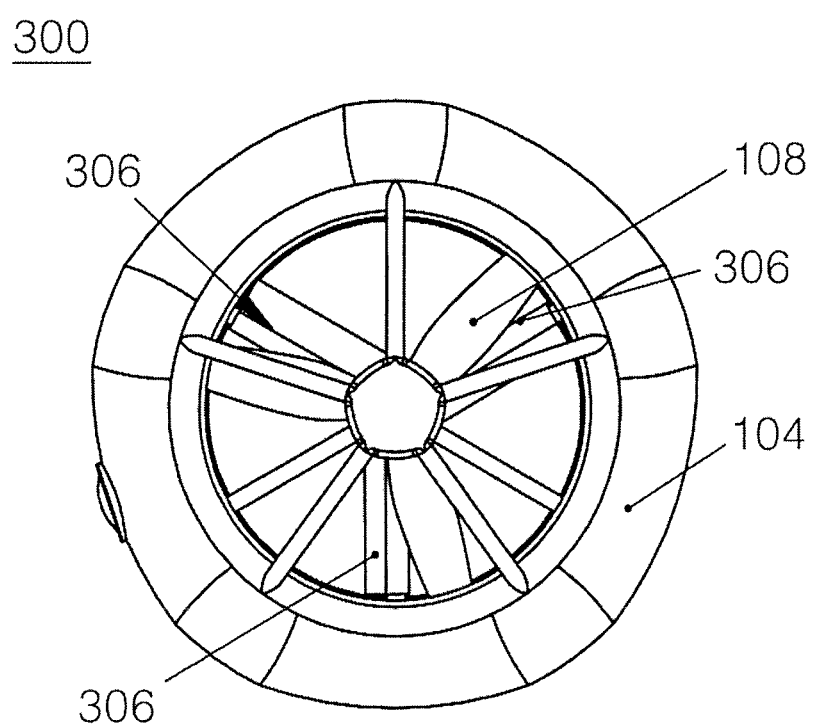
FIG. 14 is a top plan view of the UAV of FIG. 13.
Figure 15:
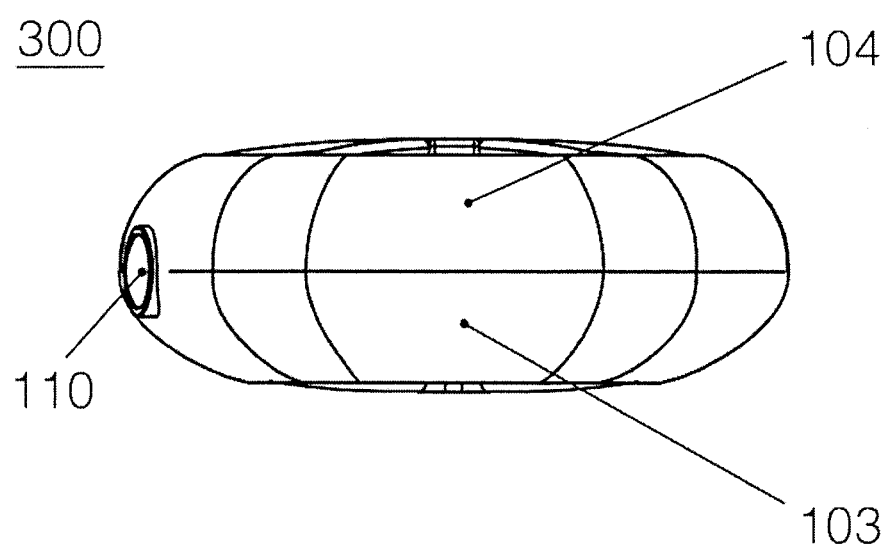
FIG. 15 is a side-elevation view of the UAV of FIG. 13.
Figure 16:
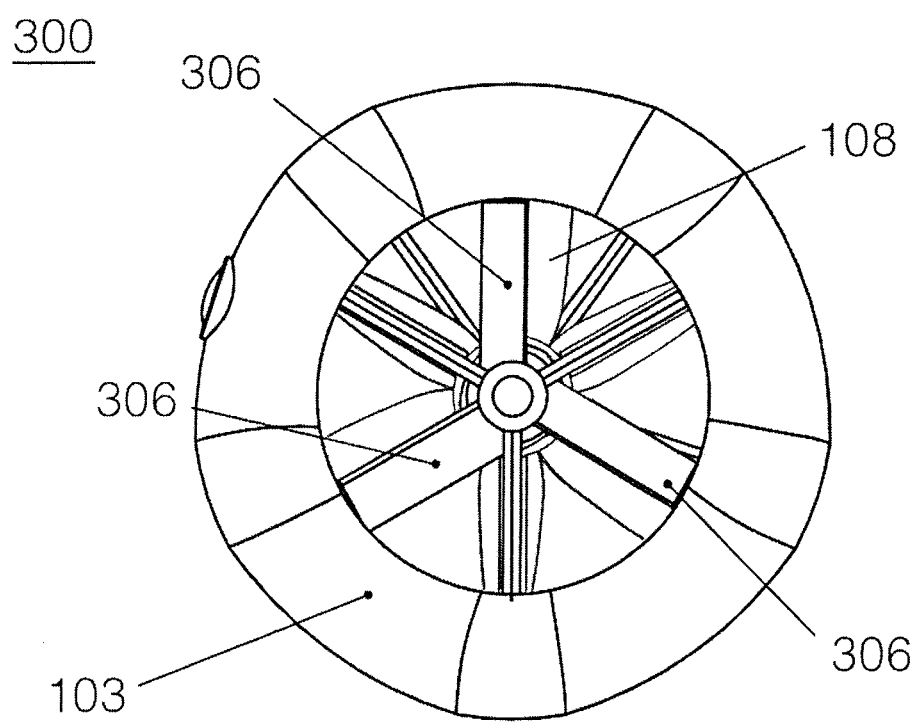
FIG. 16 is a bottom plan view of the UAV of FIG. 13.
Figure 17:
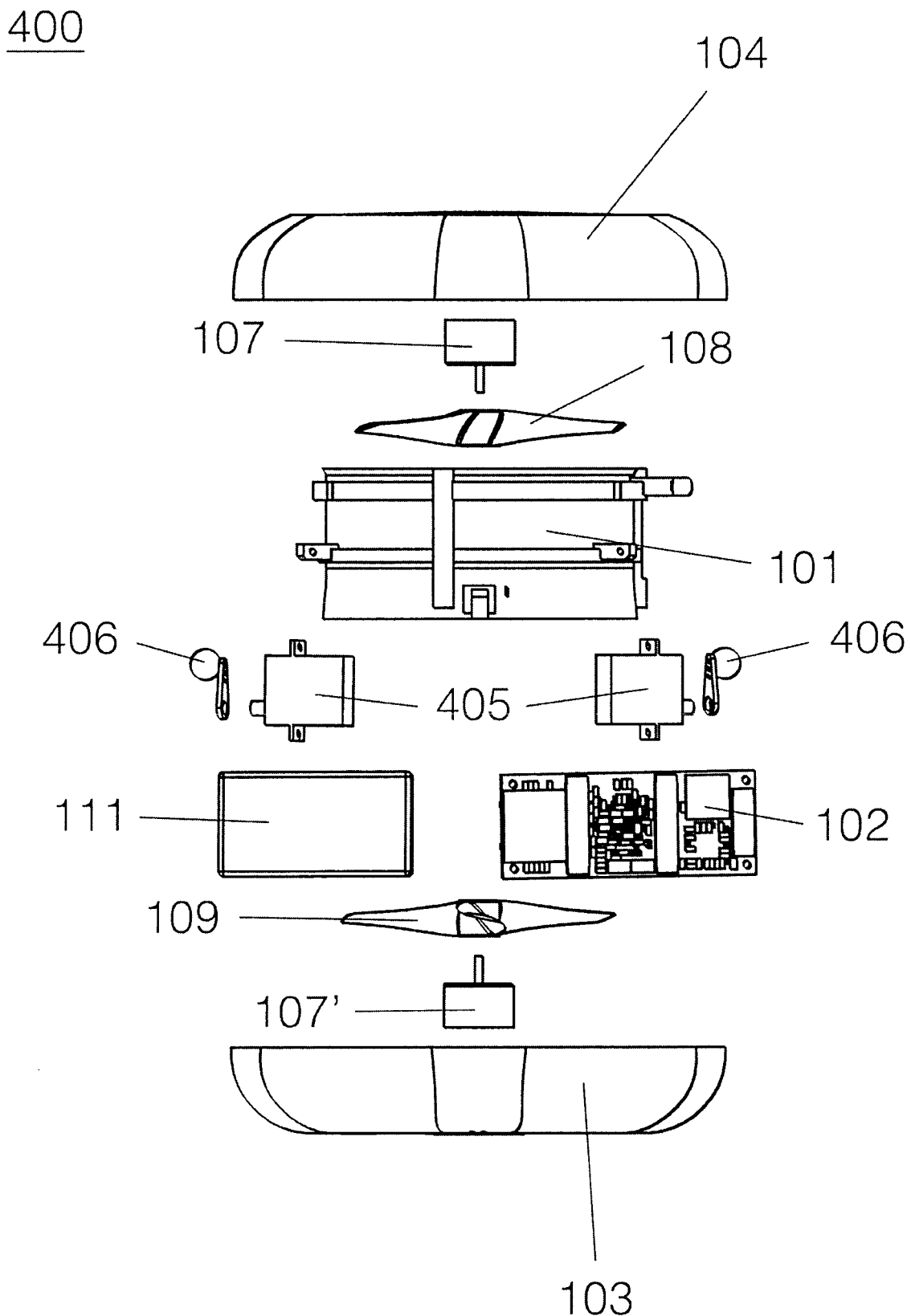
FIG. 17 is an exploded, side-elevation view schematic diagram of a UAV according to another embodiment of the present disclosure.
Figure 18:
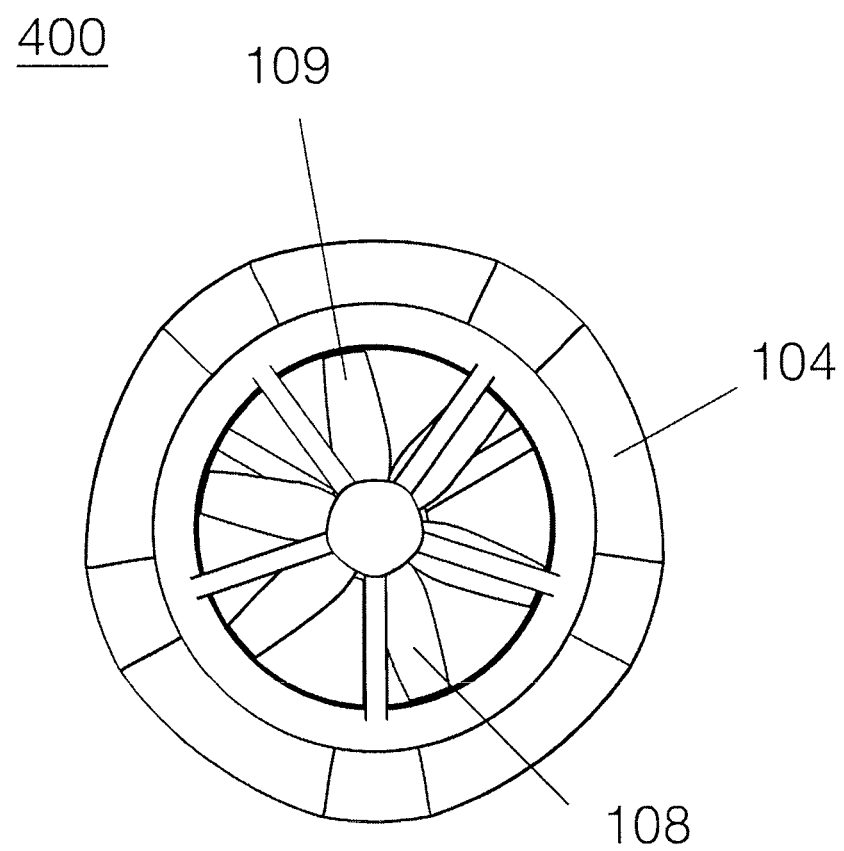
FIG. 18 is a top plan view of the UAV of FIG. 17.
Figure 19:
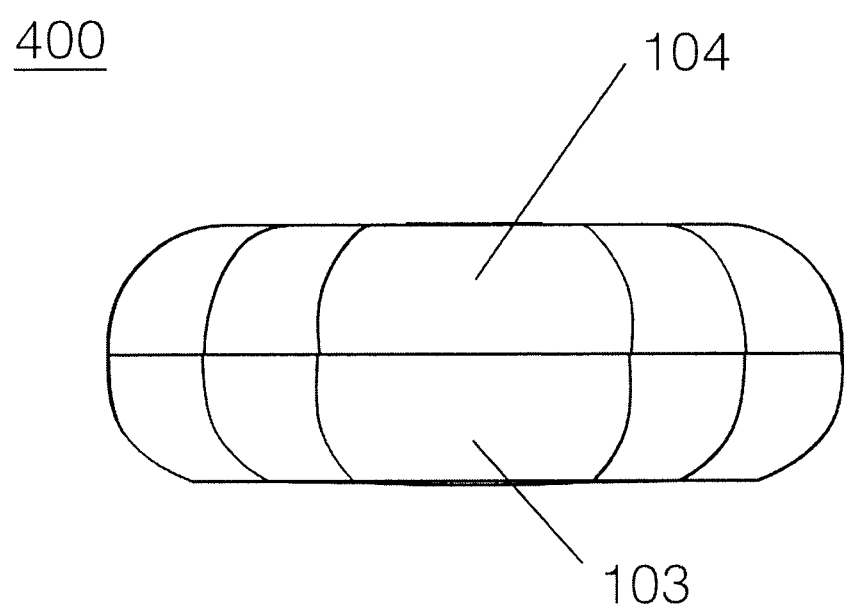
FIG. 19 is a side-elevation view of the UAV of FIG. 17.
Figure 20:
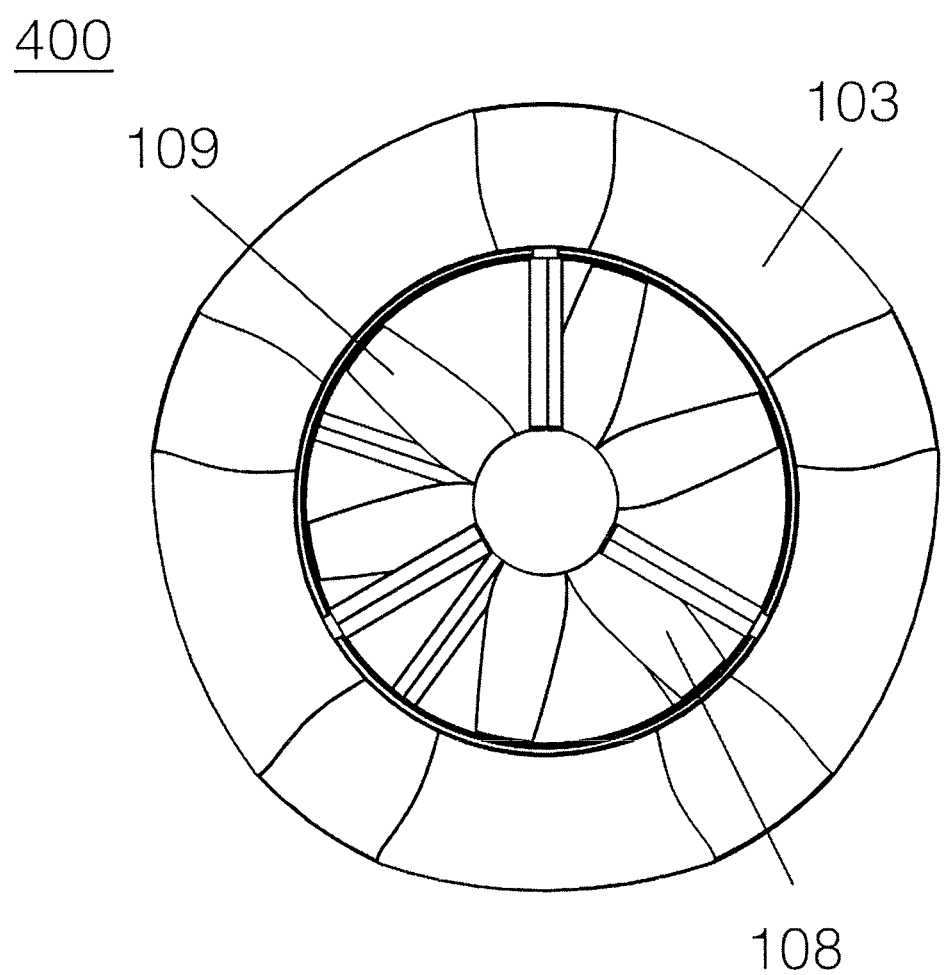
FIG. 20 is a bottom plan view of the UAV of FIG. 17.

FIG. 8 which is not to scale, shows a summary of results of computational flow dynamic (CFD) modeling analysis of the forces acting on the first UAV 100 when one flight control surface 106 is extended into the duct 101. FIG. 8A shows the effect on the thrust vector when the flaps extend about 30% of its possible extended length into the thrust airflow. FIG. 8B shows the effect on the thrust vector when the flaps extend about 60% into the thrust airflow. FIG. 8C shows the effect on the thrust vector when the flaps extend about 90% into the thrust airflow. The moment about the center of mass is depicted as "arrow M". The CFD simulation was performed using the ANSYS® Fluent software program (ANSYS is a registered trademark of SAS IP Inc., Cheyenne, Wyo., USA).

Flight and wind tunnel experiments with the first UAV 100 confirm the CFD analyses. The flaps act to shift the direction of the thrust airflow in order to control the angular velocity of the first UAV 100. This shift in the direction of airflow allows the UAV to rotate away from the engaged flap as can be seen in FIG. 8. One or more of the flaps are used to control the UAV in the pitch and roll directions, which makes it possible to change direction, steer, achieve controlled flight, and correct for disturbances in flight caused by external forces such as wind. The magnitude of the moment depends on the amount of flap extension into the airflow, and the location of the UAV's center of gravity. FIG. 8 shows how the horizontal component of the thrust vector increases as the flap is extended from 30% in 8A to 90% in 8C.

To illustrate how the control surfaces might be programmed to control the UAV, for example, FIG. 5C shows a pitch axis P, which lies on the horizontal plane and intersects the vertical axis, and which passes through the centerline of the projection of flap 106a on the horizontal plane. Also shown is a roll axis R, which also lies on the horizontal plane and intersects the vertical axis, and is orthogonal to pitch axis P. To generate a roll moment, flap 106a in instructed to protrude into duct 101. To generate a roll moment in the opposite direction, both flaps 106b and 106c are instructed to protrude into duct 101.

To generate a pitch moment, either flap 106b or flap 106c are instructed to protrude into the duct 101, depending on the desired orientation. It is worth noting that flaps 106b and 106c also produce a small roll moment along with the desired pitch moment, which the control system is designed to account for and counteract. It is also worth noting that the roll moment produced when both flaps 106b and 106c are protruded is larger than the moment produced by only protruding flap 106a at the same extension. Also, the magnitude of the moment produced by flap 106a in roll is larger than the magnitude of the pitch moment produced by flap 106b or 106c in pitch. This asymmetrical effect of the flaps is accounted for by the control system. One way to overcome this asymmetry would be to use four flaps instead of only three, where each one of the four flaps would be responsible for either pitch or roll in one direction.

Alternatively, the UAV may utilize more than 2 axes. For example, one way to achieve this would be by defining 3 axes, each lying on the horizontal plane, and each passing through the vertical axis and the centerline of the projection of each one of the control surfaces 106 on the horizontal plane. The control system will then assign each control surface to be responsible to generate a moment around one of the axes, with the two opposite control surfaces responsible for generating a moment in the opposite direction.

FIG. 6 show a further embodiment of the present disclosure that relates to another UAV 100' with a control system that includes one or more retractable flaps 106' that are positioned at or below the lower edge of the duct 101' to alter the thrust generated through a duct 101' to control pitch, roll or both of UAV 100'.

UAV 100' comprises the one or more flight control surface flaps 106' that impinge upon the airflow of thrust generated through a central duct 101'. The flaps 106' each may move in plane and may provide a substantially constant angle of incidence into the thrust airflow at a point at or below an outer lower edge of the UAV 100'. As noted above, the greater the distance between the flap and the center of gravity, the higher the magnitude of the generated moment may be. A greater magnitude of the moment may allow for greater control to stabilize and steer the UAV 100'. Thus, placement of flaps to extend out closer to the second end of the duct or from the lower surface may offer some benefits in terms of control. The control regime for these embodiments is very similar to that of UAV 100 (FIGS. 1-5C), which is explained in detail above.

Figure 6A:
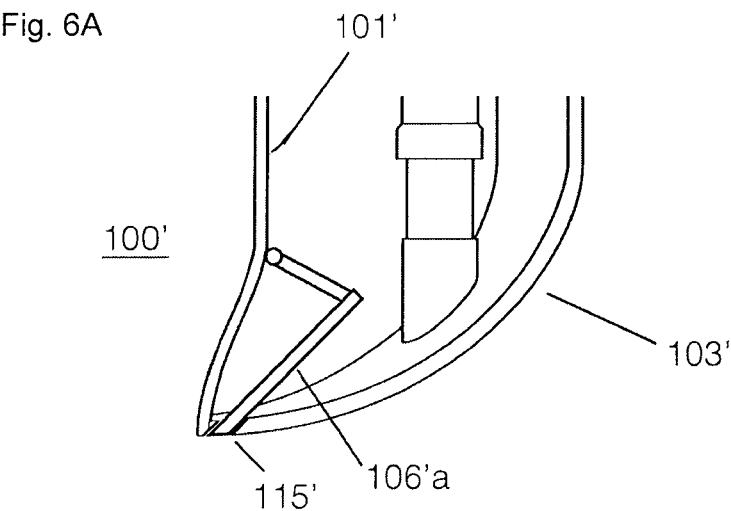
FIG. 6A shows a flap of the UAV in a retracted position.
Figure 6B:
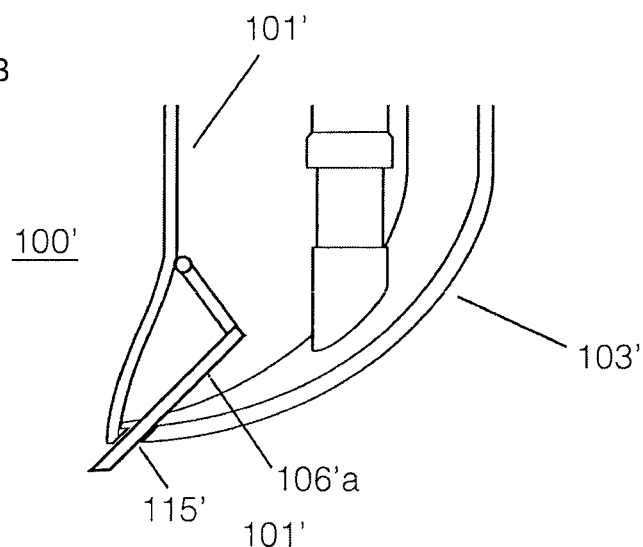
FIG. 6B shows the flap at a first position.
Figure 6C:
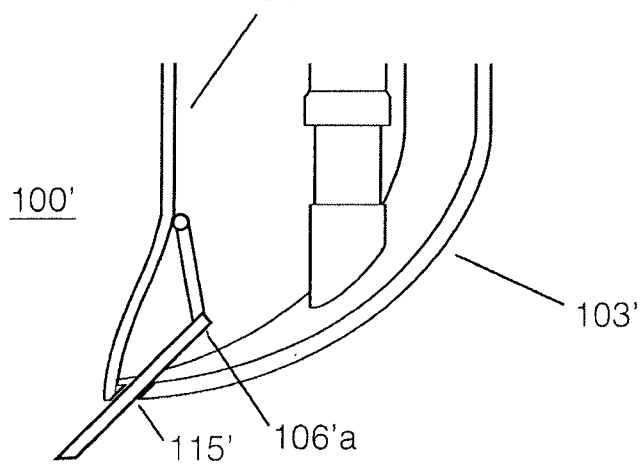
FIG. 6C shows the flap in a second position.

FIG. 6 shows one embodiment of the present disclosure that relates to UAV 100'. Only a partial section of the lower outer edge of the duct 101' is shown, with a flap 106'*a* that can extend through a slot 115' and can assume positions such as a retracted position (FIG. 6A) inside the body of the UAV 100', a first protruding, acting position (FIG. 6B) of incidence where the flap 106'*a* is disturbing the thrust airflow at or below the lower outer edge and a second, protruding position (FIG. 5C) where the flap 106'*a* has extended further into the thrust airflow than the first position. It is noted that the first position is merely illustrative and it is not intended to represent the only flap 106'*a* position that causes a minimal disturbance of the thrust airflow. Similarly, the second position is illustrative and it is not intended to represent the only flap position that causes a maximum disturbance of the thrust airflow. Regardless of the position of the flap 106'*a* within the thrust airflow, the angle of incidence of the flap is constant. In this embodiment, the flap 106'*a* may extend from inside the body, and below the outlet of the duct of the UAV 100' through an aperture in the fuselage such as a slot 115'.

Figure 7A:
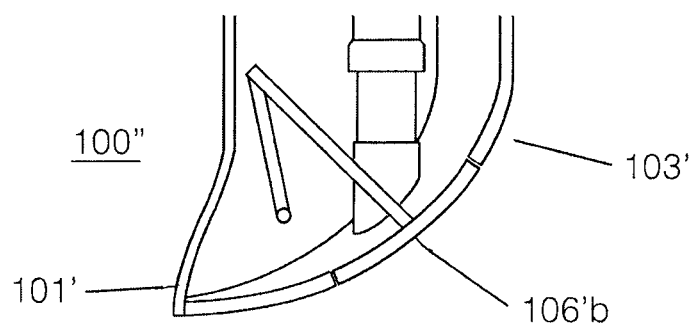
FIG. 7A shows a flap of the UAV in a retracted position.
Figure 7B:
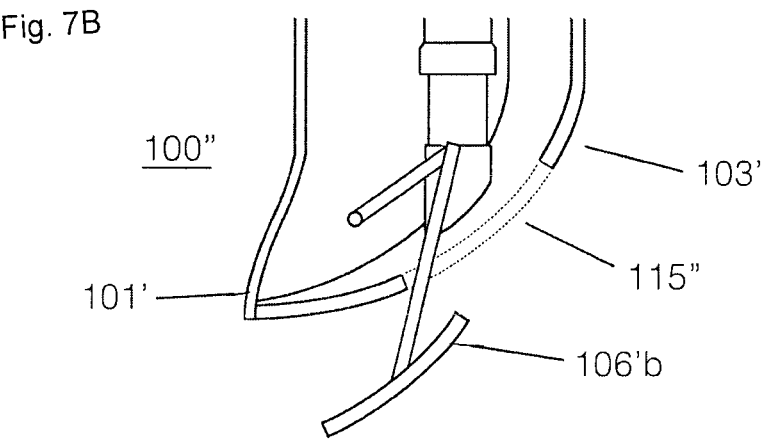
FIG. 7B shows the flap at a first position.
Figure 7C:
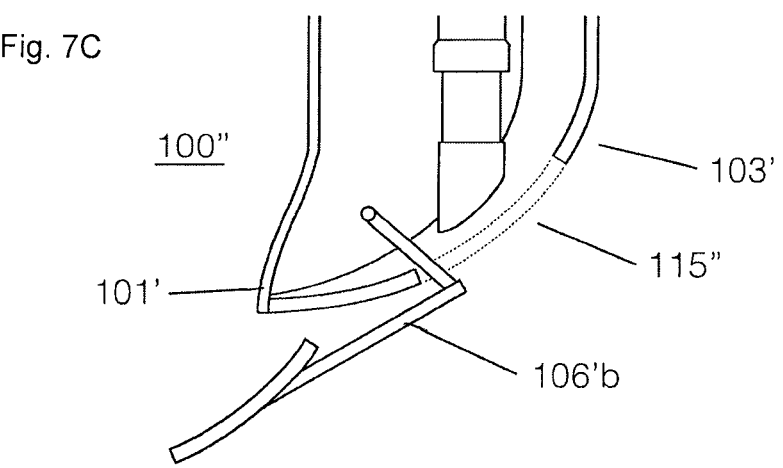
FIG. 7C shows the flap in a second position.

FIG. 7 show another embodiment of the present disclosure that relates to another UAV 100". The same reference numbers may be used to refer to this embodiment as those used to refer to the embodiment shown in FIG. 6. In the embodiment shown in FIG. 7, a flap 106'*b* may extend to various positions (compare FIG. 7A, FIG. 7B and FIG. 7C) within the thrust airflow. Flaps, while moving, may maintain a substantially constant angle of incidence with the thrust airflow, or may have a varying angle of incidence. The primary difference with this embodiment and the one shown in FIG. 6 is that the flap 106'*b* contributes more significantly towards a portion of the fuselage. In particular, the flap 106'*b* forms a part of outer shell 103' of the body of the UAV 100". When the flaps 106'*b* are fully retracted into slots 115", they are flush with the fuselage curvature at their retraction site. In particular, the flaps 106'*b* are in a position that is substantially congruent with the outer surface of the UAV 100". If desired, the flaps 106'*b* may be at least partially extended from the fully retracted position to act as landing gear for the UAV 100".

FIG. 9 to FIG. 12 show another embodiment of the present disclosure that relates to a second UAV 200. UAV 200 options are included to show that the body can accommodate other types of flight control surfaces, apart from the preferred retractable flaps 106. As will be appreciated, the primary difference between the first UAV 100 and the second UAV 200 is that the flight control surfaces of the second UAV 200 are variable angle vanes 206 permanently installed and fully exposed in the duct 101, rather than retractable flaps. The second UAV 200 may also have only one fan 108 because the at least two vanes 206 can be configured to control yaw. Unless otherwise indicated, the reference numbers used in FIG. 9 to FIG. 12 are the same as those used in FIG. 1 to FIG. 4.

The vanes 206 are positioned vertically within the duct 101 adjacent the surface of the duct 101 and are always in the airflow. The vanes 206 can be rotated about the horizontal plane of the second UAV 200. Rotating one or more of the three vanes 206 alters airflow through the duct 101 to control yaw, pitch and roll of the second UAV 200.

FIG. 13 to FIG. 16 show another embodiment of the present disclosure that relates to a third UAV 300. The second UAV 200 and the third UAV 300 are similar in that they include permanently exposed control surfaces 206 and 306 in the duct. Similarly to the vanes 206 in the second UAV 200, the control surfaces 306, which are vertical louvres, are not retractable and do not have a fixed angle of incidence. Unless otherwise indicated, the reference numbers used in FIG. 13 to FIG. 16 are substantially the same as those used in FIG. 1 to FIG. 4.

The vertical louvres 306 are positioned vertically within the duct 101 adjacent the surface of the duct 101. The louvres 306 can be rotated about the horizontal axis or another axis that is substantially parallel to the horizontal plane of the third UAV 300. Rotating one or more of the three louvres 306 alters airflow through the duct 101 to control yaw, pitch and roll of the third UAV 300.

While UAV's 200 and 300 are illustrated to show that the beneficial body shape can be used with other flight control surfaces, the flaps 106, 106'*a,* 106'*b* of UAVs 100, 100' and 100" offer advantages over UAVs with permanent exposed vanes/louvres in terms of simplicity, size minimization, safety and durability.

FIG. 17 to FIG. 20 show another embodiment of the present disclosure that relates to a fourth UAV 400. UAV 400 uses control weights 406 instead of flight control surfaces for control. These control weights 406 are made of a relatively dense material such as metal and can vary in size, shape and weight depending on overall size and weight of UAV 400. Unless otherwise indicated, the reference numbers used in FIG. 17 to FIG. 20 are substantially the same as those used in FIG. 1 to FIG. 4. During substantially vertical takeoff, the weights will be positioned in such a way that the center of gravity is along the vertical axis of UAV 400. Flight of UAV 400 may be changed from only vertical lift by altering the position of the center of gravity such that it is no longer along the axis x, causing a rotation and therefore translation of the UAV in the direction of the new center of gravity. Altering the position of the center of gravity may be achieved by the microprocessor instructing one or more of the actuators 405 to move the respective control weight 406. The actuators can be linear or rotary.

As noted above, the UAVs 100, 100', 100", 200, 300 and 400 may each have a second fan 109 that is also positioned within the duct 101 and that rotates in the opposite direction than the fan 108. As a further option, the UAVs 100, 100', 100", 200, 300 and 400 may have a second motor 107' for rotating the second fan 109. Rotating the first and second fans 108, 109 at different speeds may also be used to modulate yaw. Furthermore, having two fans running on one or two motors 107, 107' for the UAVs 100, 100', 100", 200, 300 and 400 provide additional thrust and may provide redundancy that could mitigate the risk of an uncontrolled fall due to failure of one fan 108 or 109 or one motor 107 or 107'. In some embodiments of the present disclosure, the flight-control system 102 can go into a fail-safe mode if one fan or motor stop functioning to bring the UAV into a soft landing, thus avoiding a hard crash and potential damage to life, property and the UAV itself.

Figure 21:
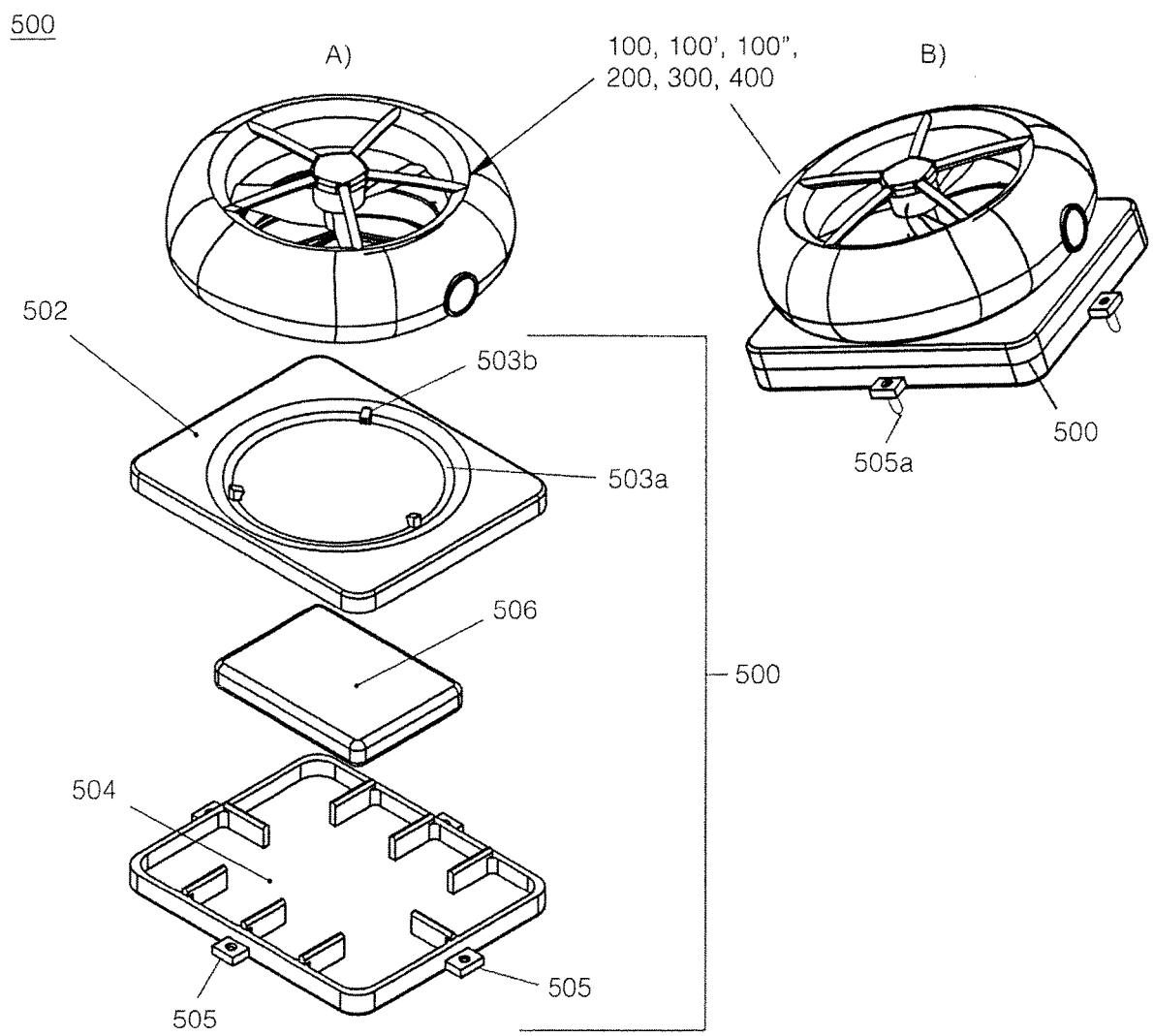
FIG. 21 is a schematic that shows another embodiment of the present disclosure.

FIG. 21 shows another embodiment of the present disclosure that relates to a mounting device 500 that is suitable for detachably mounting any of the first, second, third or fourth UAVs 100, 100', 100", 200, 300, 400.

Because the UAV is so small and may contain position sensors, cameras and other devices with broad application for positioning and recording, the UAV may, apart from flight applications, be readily used in a multipurpose video capture assembly for recording, monitoring and guidance. As such a mounting device may be provided for supporting the UAV in a secure position, while the mounting device 500 is supported on, or connected to, another surface. The mounting device 500 has a UAV supporting surface 502 that is configured to support and possibly releasably engage and couple the UAV 100, 100', 100", 200, 300, 400 to the mounting device 500. The UAV supporting surface may have a circular recess 503a about the same outer diameter as the UAV to secure the UAV against sideways shifting. Alternately or in addition, supporting surface 502 may include one or more connectors 503b for releasably, engaging the UAV. The UAV may, therefore, be firmly secured via the connectors onto the mounting device, but may be detachable by application of force or actuation of a release mechanism. Connectors 503b may, for example, include clips, straps, magnets, latches, fasteners, or other devices.

The mounting device 500 also has a mounting surface 504 connected to the UAV supporting surface. The mounting surface 504 is configured to support, and possibly engage and couple, the mounting device 500 on/to another object. For example, the mounting surface 504 may define one or more support structures such as legs or connection structures such as, for example, suction cups or mounting flanges with apertures 505 each for temporarily or permanently securing the mounting device to an object. For example, a connector 505a may be secured through the apertures and be connected to the other object. Connectors may include items such as a strap for example with an adjustable mechanism, fasteners (i.e. screws, pins, nails), clamps, or the like. The other object is not limited and may include: (i) a user's article of clothing, for example accessories such as hats, wristbands or head bands; (ii) a user's article of sporting equipment, such as a helmet or shoulder pads; or (iii) a user's vehicle, such as an automobile, a motorcycle, a watercraft or the like. The other object may even be a surface within or outside of a building such as a ledge.

While the mounting device 500 is illustrated simply as a plate form, in some embodiments of the present disclosure, the mounting device may be configured for demountably engaging a support element such as a bicycle frame or a bicycle seat or a bicycle seat post or handlebars. Such a mounting device may demountably engage other types of support elements that can be held by the user, or attached to the user, or mounted onto equipment that the user is using. Suitable support elements can be for example, extendable/retractable poles, extendable/retractable scissor-type mounts, and frame engaging mounts such as those used for mounting GOPRO® cameras (GOPRO is a registered trademark of GoPro Inc., San Mateo, Calif., USA).

Some components of the payload, including the sensors and/or the camera 110, may be operational while the UAVs 100, 100', 100", 200, 300 or 400 are mounted. In some embodiments of the present disclosure, the mounted UAVs 100, 100', 100", 200, 300, 400 may collect data, which may include images and videos. As discussed further below, the collected data may be stored onboard the UAV, on a storage component of the mounting device or the collected data may be transmitted to an external device.

In some embodiments of the present disclosure, the mounting device 500 further comprises a supplemental power source 506. The supplemental power source 506 may be directly connectible to a power outlet and rechargeable with the capability to transfer electric power to the engaged and coupled UAV 100, 100', 100", 200, 300, 400. The transfer of electric power may be via a direct coupling, such as through physically coupled conductors, or indirect contact, such as through an inductive power-transfer mechanism. In one embodiment, one or more of the connectors 503b also act as a conductor to conduct recharging power to the UAV.

In other embodiments of the present disclosure, the mounting device 500 has surface 502 but no conductors that physically couple the UAV 100, 100', 100", 200, 300, 400. Instead the UAV 100, 100', 100", 200, 300, 400 will rest upon the surface 502 in proximity to the supplemental power source 506 for wireless charging. In these embodiments of the present disclosure, the mounting device 500 may have a battery, or may be connected directly to a power outlet and it could also have a flat surface to sit on top of another substantially flat surface, such as a piece of furniture or part of another structure such as a ledge or floor.

As will be appreciated therefore, the UAV can therefore have expanded utility and value by being configured with the mounting device to operate, when not in flight, as a mounted security monitor, dash camera, body camera, personal positioning device, etc.

In some embodiments of the present disclosure, the fuselage of the UAVs 100, 100', 100", 200, 300, 400 may further comprise a shroud 119 as shown in FIG. 5A, that can support one motor and protect against intrusions into the duct 101 that could interfere with the rotating movement of the fan 108 within the duct 101. The shroud may be on either or both of the outer upper-surface and the outer lower-surface. The shroud could be made of bars that arc substantially radial, or that form a crisscross shape, or any other shape. The bars could be round, rectangular or any other shape. In some embodiments, they are tear-drop shaped to minimize their drag, as shown in FIG. 5A.

In some embodiments of the present disclosure, the UAVs 100, 100', 100", 200, 300, 400 can be controlled through a direct user-input using any electronic device that is capable of wireless communication including but not limited to radio, Bluetooth, Wi-Fi, cellular, and combinations thereof. For example, the electronic device may be a handheld device including but not limited to a smartphone, a radio controller, a tablet, a laptop computer, and combinations thereof.

In some embodiments of the present disclosure, the UAV 100, 100', 100", 200, 300, 400 comprises the WTR unit that communicates between the microprocessor controller and the electronic device. For example, the WTR unit can receive commands from the electronic device and forward those commands to the microprocessor controller. The WTR unit will also receive information from the microprocessor controller, or other components of the payload and transmit that information to the electronic device. In some embodiments of the present disclosure, the microprocessor controller may also be able to control at least the flight-control system of the UAV 100, 100', 100", 200, 300, 400 autonomously through artificial intelligence, software algorithms and/or input from external sensors without the need for commands from the electronic device i.e. without user input. Optionally, an array of sensors and/or images captured by the onboard camera may be used to aid in autonomous flight by providing obstacle detection, facial recognition, shape detection, target follow and other capabilities.

The user can control the UAV 100, 100', 100", 200, 300, 400 via a graphical user interface (GUI) that is generated by a software application that is operating on the electronic device. Optionally, the user may use simplified and intuitive controls or gestures such as up-down and left-right, zooming in-out to control the location of the UAV 100, 100', 100", 200, 300, 400 instead of the traditional throttle, pitch, roll and yaw controls. In other embodiments of the present disclosure, the user may use the traditional controls through the GUI and the software application.

Figure 22:
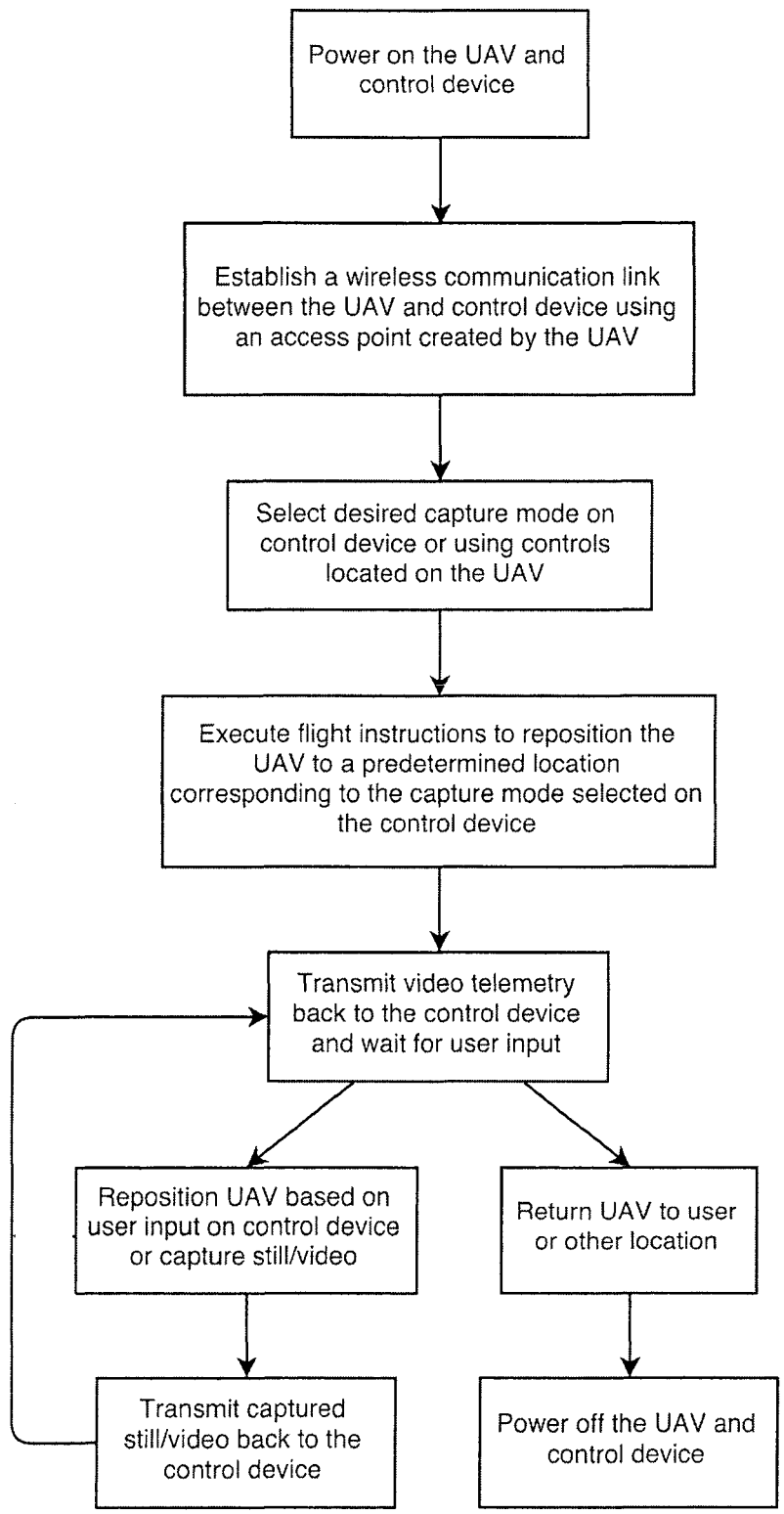
FIG. 22 is a schematic that shows an example logic-process according to some embodiments of the present disclosure.

Some embodiments of the present disclosure relate to a method of operating a UAV. FIG. 22 shows the logic-process of one method of operating a UAV. For example, the method comprises a step of operating the UAV 100, 100', 100", 200, 300, 400 by using a software application installed on an electronic device, preferably a handheld electronic control device. According to the method, after powering on the UAV and the control device, the user can communicate with the UAV 100, 100', 100", 200, 300, 400 by electronic communication through the electronic device. Preferably, the electronic communication is a wireless electronic communication that occurs through the WTR Unit that is part of the payload. The user may establish a communication connection between the electronic device and the microprocessor controller of the UAV 100, 100', 100", 200, 300, 400. Once the communication connection is established, the user can interact with the UAV 100, 100', 100", 200, 300, 400 using the GUI. As an example, the user may desire to use the UAV 100, 100', 100", 200, 300, 400 to take one or more picture or video images. While using the GUI, the user will select the desired picture or video mode which the electronic device will communicate as a command to the microprocessor controller of the UAV 100, 100', 100", 200, 300, 400. Of course, this capture mode could also be selected using controls on the UAV.

Flight instructions can be executed to reposition the UAV. For example, the UAV microprocessor can also receive the message from the electronic device, for example through user activated buttons located on the UAV, and initiate a take-off sequence by sending take-off instructions to the flight control system 102. Take-off instructions may comprise starting at least one of the one or more motors 107, 107' and activating one or more of the actuators 105. The UAV 100, 100', 100", 200, 300, 400 will then take off and fly to a predetermined position that corresponds to the capture mode selected by the user. Non-limiting examples of picture modes include a "selfie" mode, a bird's eye view mode, a panoramic-shot mode, an aerial-video mode, a 360-degree video mode, a thermal-imaging mode and the like.

The microprocessor controller will use one or more of proximity sensors, IMU, GPS, sonar or any other location-determining equipment that is part of the payload to determine when the UAV 100, 100', 100", 200, 300, 400 has reached the predetermined position. Once in the predetermined position, the microprocessor controller may send a message to the user that the predetermined position has been reached. The microprocessor will periodically use the location determining equipment to ensure that the UAV 100, 100', 100", 200, 300, 400 has not strayed from the predetermined position or course. The microprocessor will receive or request further information from the location-determining equipment that the UAV 100, 100', 100", 200, 300, 400 has not strayed from the predetermined position. The further information may be provided on a scheduled interval for example once every 10 milliseconds or less, and further information may be provided substantially constantly to the microprocessor controller. If the further information regarding location indicates to the microprocessor controller that the UAV 100, 100', 100", 200, 300, 400 has strayed from the predetermined position by a threshold amount, then the microprocessor controller will initiate and send instructions to the flight-control system 102 to move the UAV 100, 100', 100", 200, 300, 400 back to the predetermined position by adjusting the airflow through the duct 101 through adjusting the positions of the one or more flight control surfaces 106, 206, 306 or control weights 406, or adjusting the rotational speed of the one or more motors 107, 107' to better maintain the predetermined position. The threshold amount may be about 10% to 50% of the width of the UAV 100, 100', 100", 200, 300, 400 or any other amount that substantially changes the perspective of the camera and the images that the camera may take.

When the UAV 100, 100', 100", 200, 300, 400 is in the predetermined position, the microprocessor will initiate a hover command in an effort to stabilize the UAV 100, 100', 100", 200, 300, 400 at the predetermined position. Optionally the microprocessor will also initiate a camera-stabilization command to a camera gimbal that forms part of the payload. The camera will transmit a live video-stream for the user to view on the GUI. At this point, the user can command the camera to take a picture or video. The picture or video may then be transmitted to and stored on the electronic device. In some embodiments of the present disclosure, the payload may also include some digital memory capacity. User input can control the capture mode and next steps.

Before or after capturing the picture or video images, the user may adjust the position of the UAV 100, 100', 100", 200, 300, 400 by using the GUI provided on the electronic device, which will then send one or more position adjustment commands to the microprocessor controller, which in turn generates and sends adjustment instructions to the flight-control system to adjust the position of the UAV 100, 100', 100", 200, 300, 400 and hence adjust the image that the camera may take.

In some embodiments of the present disclosure, the payload may also include one or more camera actuators for adjusting the angular position and focus of the camera itself relative to the fuselage. The one or more camera actuators may be controlled by the user interacting with the GUI.

In some embodiments of the present disclosure, the UAV 100, 100', 100", 200, 300, 400's yaw, horizontal position, vertical position of the drone, the pitch and roll can be adjusted using dedicated buttons on the GUI, or by using pre-programmed multi-touch gestures on the GUI including but not limited to pinching, spreading, touch-and-drag.

When the user is satisfied with the captured images, a recovery sequence can be initiated by the user via the GUI. The recovery sequence may use a dead reckoning algorithm or any other location-determining equipment to return the UAV 100, 100', 100", 200, 300, 400 to the location where it took off from, to a new position that is based upon the location of the electronic device, or to a new location that the user selects from a map function of the software application. A proximity sensor can be included in the payload that detects when the UAV 100, 100', 100", 200, 300, 400 drone is close to the user's hand or to any other surface, and the proximity sensor will send a message to the microprocessor controller to initiate a shut-down sequence so that the UAV 100, 100', 100", 200, 300, 400 comes to a smooth and gentle landing.

In some embodiments of the present disclosure, the UAV 100, 100', 100", 200, 300, 400 may also pursue a moving target, such as a target electronic device. For example, as a user walks with the target electronic device carried, or stored in a piece of clothing, the UAV 100, 100', 100", 200, 300, 400 may follow at a predetermined distance following positioning that is maintained substantially constant relative to the moving electronic device. In some embodiments of the present disclosure, the UAV 100, 100', 100", 200, 300, 400 may lock on to an object or person through facial detection, thermal footprint, or other recognition hardware and software which the user manually selects, or as identified by an algorithm that is run on the microprocessor and optionally further sensors that form part of the payload.

In some embodiments of the present disclosure, the UAV 100, 100', 100", 200, 300, 400 may also be controlled through user generated voice commands or gestures. The gestures can include, but are not limited to hand movements, facial expressions, and the like. These commands will be captured through the onboard camera, a microphone, or other sensors, and analyzed by the microcontroller or other equipment which can be onboard or remote. The flight control system 102 can then use these commands to change the flight path, or perform certain functions such as capturing images or other data.

In some embodiments of the present disclosure, the controller may be in communication with a remote processor that performs more complicated computing, such as obstacle detection, running an artificial intelligence algorithm, a flight control algorithm, facial recognition functions and the like so that the payload weight can be minimized. The remote processor may be on the electronic device or it may be a remote server.

In some embodiments of the present disclosure, the UAV 100, 100', 100", 200, 300, and 400 may be temporarily mounted on a mounting device 500. The mounting device 500 may be situated in a user's home and it may receive sensory information from sensors positioned about the user's home. For example, the sensors may be motion sensors that are triggered when there is unexpected motion within the user's home or when there is an unexpected increase in temperature or carbon monoxide. Triggering of these sensors will trigger the UAV 100, 100', 100", 200, 300, 400 to take-off and fly through the user's home to capture images of what stimulus triggered the sensor. For example, a motion sensor may be set off by an intruder or a user's unexpected fall. The UAV 100, 100', 100''', 200, 300, and 400 may then release from the mounting device 500 and fly to the location of the triggered sensor and begin capturing pictures or video. The captured pictures or video will then be transmitted to a user's electronic device e.g. smartphone or to a monitoring station. Sensors onboard the UAV 100, 100', 100", 200, 300, 400 itself may also trigger the camera to capture images or videos while the UAV 100, 100', 100", 200, 300, and 400 is stationary on the mounting device 500, or it might trigger the UAV to initiate a flight sequence and capture images or videos from an alternate location, or both. These embodiments are useful as home surveillance programs and for surveillance of elderly people who may be susceptible to falling and requiring medical assistance.

In other embodiments of the present disclosure, the UAV 100, 100', 100", 200, 300, and 400 may be programmed to perform a pre-determined flight path through the user's home to provide live video feedback as a virtual walkthrough of the user's home. This embodiment may be useful as part of a security system or for realtors to develop marketing videos of their client's homes.

In other embodiments of the present disclosure, the UAV 100, 100', 100", 200, 300, and 400 may be used to perform reconnaissance and/or search-and-rescue operations by flying into environments that are not suitable for individuals or larger UAVs.

It will be apparent that many other changes may be made to the illustrative embodiments, while falling within the scope of the invention and it is intended that all such changes be covered by the claims appended hereto.

The invention claimed is:

1. An unmanned aerial vehicle, comprising:
   a body that is substantially toroidal and defines a duct with an upper end and a lower end that is opposite to the upper end, a vertical axis extending through a center of the body and from the upper end to the lower end;
   an electronic controller housed within the body;
   at least one electric motor that is controlled by the electronic controller;
   at least one fan within the duct that is operatively coupled to the at least one electric motor for rotating the at least one fan and creating an airflow into the upper end of the duct and out the lower end of the duct for creating thrust; and
   a flight-control system including at least two flaps installed on the body and configured to;
      receive one or more instructions from the electronic controller to control a pitch and a roll of the unmanned aerial vehicle during flight; and
      drive, to change a direction, a pressure and a rate of the airflow at the lower end of the duct responsive to the one or more instructions from the electronic controller to control the pitch and the roll, one or more of the at least two flaps between a retracted position in the body and a protruded position out from the body and into an area of the duct adjacent the lower end while maintaining a fixed angle of incidence between the at least two flaps and the vertical axis extending through the center of the body.

2. The unmanned aerial vehicle of claim 1, wherein the body has a height of between about 15 and 60 mm and an outer diameter of between about 50 and 150 mm.

3. The unmanned aerial vehicle of claim 1, further comprising an actuator for each of the at least two flaps, the actuator for each of the at least two flaps operable to drive each of the at least two flaps from the retracted position to the protruded position with 100% extension in less than one second.

4. The unmanned aerial vehicle of claim 1, wherein in the retracted position, at most only a portion of each of the at least two flaps is exposed and the portion is substantially flush with the body.

5. The unmanned aerial vehicle of claim 1, further comprising a stop on each of the at least two flaps to limit further retraction movement beyond the retracted position.

6. The unmanned aerial vehicle of claim 1, wherein each of the at least two flaps has side edges and a middle region between the side edges and each of the at least two flaps is installed in a concave orientation with the side edges closer to the at least one fan than the middle region.

7. The unmanned aerial vehicle of claim 1, wherein the body has a varying radial length formed by a varying outer surface curvature along a circumference of the body.

8. The unmanned aerial vehicle of claim 1, wherein the duct has an inner diameter that flares at the lower end.

9. The unmanned aerial vehicle of claim 1, further comprising a center of gravity configured to be at or above a midpoint between the upper end and the lower end and the at least two flaps are positioned adjacent the lower end.

10. The unmanned aerial vehicle of claim 9, further comprising a power source, and wherein the power source is positioned in the body to configure the center of gravity to be on a center axis of the duct at or above the midpoint.

11. The unmanned aerial vehicle of claim 1, wherein the at least one fan includes a first fan and a second fan configured for counter rotation.

12. The unmanned aerial vehicle of claim 1, wherein the one or more instructions comprise:
 a first instruction to control the pitch and a second instruction to control the roll; or
 a single instruction to control both the pitch and the roll.

13. The unmanned aerial vehicle of claim 1, wherein responsive to the one or more instructions the flight-control system is configured to:
 drive a first flap of the at least two flaps to control both the pitch and the roll;
 drive the first flap of the at least two flaps to control the roll, and drive a second flap of the at least two flaps to control the pitch; or
 drive a plurality of the at least two flaps to control both the pitch and the roll.

14. A system for controlling an unmanned aerial vehicle, comprising:
 the unmanned aerial vehicle comprising:
  a body that is substantially toroidal and defines a duct with an upper end and a lower end that is opposite to the upper end, a vertical axis extending through a center of the body and from the upper end to the lower end;
  an electronic controller housed within the body;
  at least one electric motor that is controlled by the electronic controller;
  at least one fan within the duct that is operatively coupled to the at least one electric motor for rotating the at least one fan and creating an airflow into the upper end of the duct and out the lower end of the duct for creating thrust; and
  a flight-control system including at least two flaps installed on the body and configured to:
   receive one or more instructions from the electronic controller to control a pitch and a roll of the unmanned aerial vehicle during flight and
   drive, to change a direction, a pressure and a rate of the airflow at the lower end of the duct responsive to the one or more instructions from the electronic controller to control the pitch and the roll, one or more of the at least two flaps between a retracted position in the body and a protruded position out from the body and into an area of the duct adjacent the lower end
   while maintaining a fixed angle of incidence between the at least two flaps and the vertical axis extending through the center of the body,
 wherein the system comprises a software application with a user interface that, responsive to an interaction, generates one or more commands that are communicated to the electronic controller for changing an output of the at least one electric motor, a position of each of the at least two flaps, or both.

15. A multipurpose video capture assembly comprising:
 an unmanned aerial vehicle (UAV) including:
  a body that is substantially toroidal and defines a duct with an upper end and a lower end that is opposite to the upper end, a vertical axis extending through a center of the body and from the upper end to the lower end;
  an electronic controller housed within the body;
  at least one electric motor that is controlled by the electronic controller;
  at least one fan within the duct that is operatively coupled to the at least one electric motor for rotating the at least one fan and creating an airflow into the upper end of the duct and out the lower end of the duct for creating thrust; and
  a flight-control system including at least two flaps installed on the body and configured to:
   receive one or more instructions from the electronic controller to control a pitch and a roll of the UAV during flight; and
   drive, to change a direction, a pressure and a rate of the airflow at the lower end of the duct responsive to the one or more instructions from the electronic controller to control the pitch and the roll, one or more of the at least two flaps between a retracted position in the body and a protruded position out from the body and into an area of the duct adjacent the lower end
  while maintaining a fixed angle of incidence between the at least two flaps and the vertical axis extending through the center of the body; and
 a mounting device including:
  a UAV supporting surface configured to support the UAV on the mounting device; and
  a mounting surface connected to the UAV supporting surface and configured to support the mounting device on an object.

16. The multipurpose video capture assembly of claim 15, wherein the UAV further includes one or more connectors for releasably engaging the UAV to the UAV supporting surface.

17. The multipurpose video capture assembly of claim 15, further comprising supporting structures on the mounting surface.

18. The multipurpose video capture assembly of claim 17, wherein the supporting structures are apertures, and the multipurpose video capture assembly further comprises a connector that secures the object to the mounting surface via the apertures.

19. The multipurpose video capture assembly of claim 15, wherein the UAV further comprises a camera installed in the body and the UAV is configured for operation to collect data via the camera while supported on the mounting device.

20. The multipurpose video capture assembly of claim 15, wherein the mounting device further comprises a supplemental power source for charging or powering the UAV.

\* \* \* \* \*